(12) United States Patent
Shinohara et al.

(10) Patent No.: US 6,339,278 B1
(45) Date of Patent: Jan. 15, 2002

(54) INCLINATION ADJUSTING DEVICE FOR LIGHT CONTROLLING ELEMENT USED IN OPTICAL SCANNER

(75) Inventors: Tsuyoshi Shinohara; Hirokazu Izawa; Katsuya Seko, all of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/571,266

(22) Filed: May 15, 2000

Related U.S. Application Data

(63) Continuation of application No. 09/102,763, filed on Jun. 23, 1998.

(30) Foreign Application Priority Data

Jun. 23, 1997 (JP) .............................. 9-165635
Jan. 30, 1998 (JP) .............................. 10-18953
May 26, 1998 (JP) ........................... 10-144335

(51) Int. Cl.$^7$ ................................................ H02N 2/00
(52) U.S. Cl. .............................. 310/323.03; 310/323.17
(58) Field of Search ........................... 310/328, 323.03, 310/323.17

(56) References Cited

U.S. PATENT DOCUMENTS

| 4,841,978 | A | * | 6/1989 | Eventoff et al. | 128/660.09 |
|---|---|---|---|---|---|
| 5,210,651 | A | | 5/1993 | Shibuya et al. | 389/871 |
| 5,274,295 | A | * | 12/1993 | Tsukimoto et al. | 310/323 |
| 5,610,752 | A | | 3/1997 | Hayakawa | 355/198 |
| 5,659,821 | A | * | 8/1997 | Kawakita et al. | 310/328 |
| 5,739,623 | A | * | 4/1998 | Kanazawa et al. | 310/323 |

FOREIGN PATENT DOCUMENTS

| JP | 03-32376 A | * | 2/1999 | 310/328 |
|---|---|---|---|---|
| JP | 11-72740 A | * | 3/1999 | 310/328 |

* cited by examiner

*Primary Examiner*—Thomas M. Dougherty
(74) *Attorney, Agent, or Firm*—Pillsbury Winthrop LLP

(57) ABSTRACT

An inclination adjusting device for a light controlling element used in an optical scanner of a laser printer etc. includes an ultrasonic motor including a stator with a piezoelectric element and a rotor rotated by a traveling wave generated in the stator and a light controlling element having an inclination adjusted according to rotation of the rotor.

19 Claims, 21 Drawing Sheets

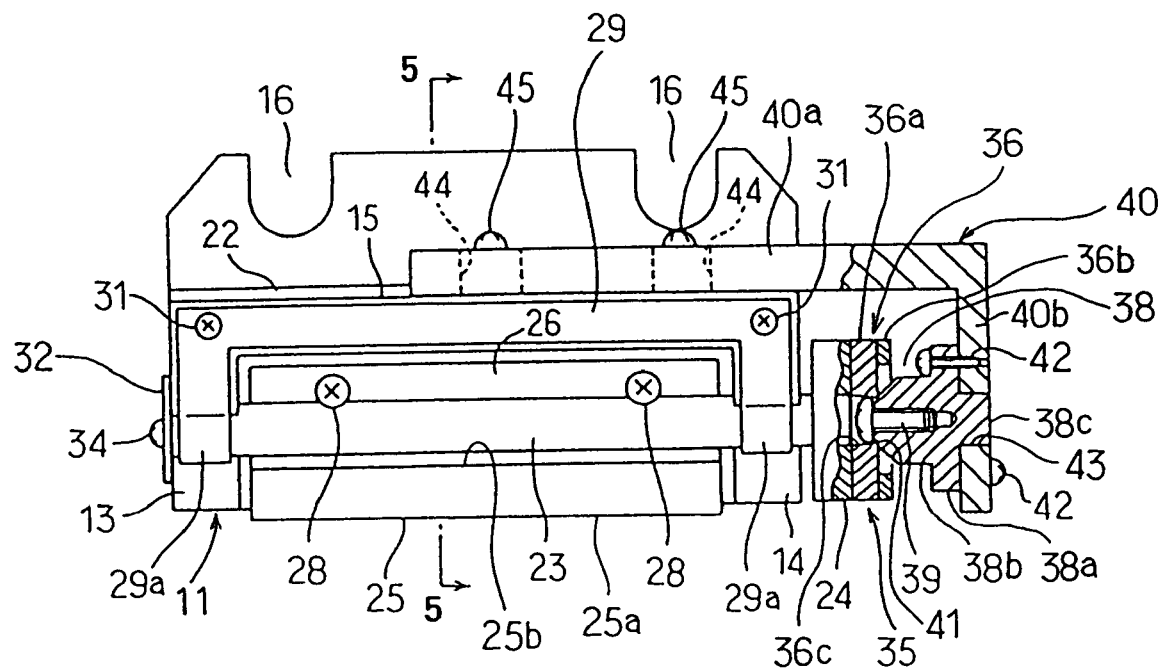
F I G. 1
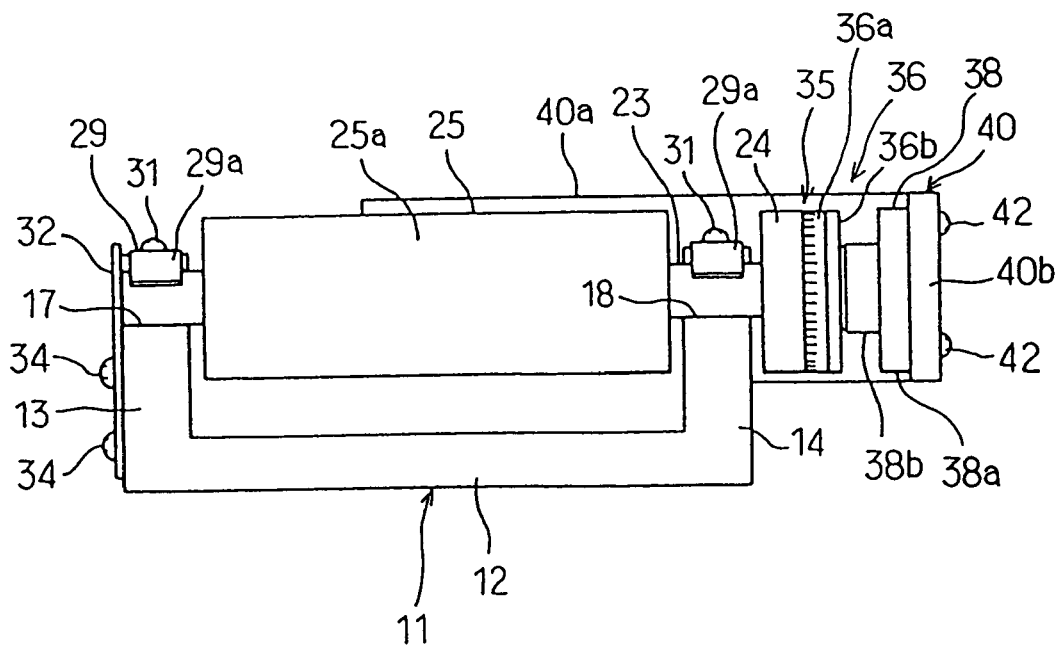
F I G. 2

INCLINATION ADJUSTING DEVICE FOR LIGHT CONTROLLING ELEMENT USED IN OPTICAL SCANNER

This is a continuation of application Ser. No. 09//102,763, filed Jun. 23, 1998.

BACKGROUND OF THE INVENTION

1. Field of the Invention

An aspect of the invention relates to an inclination adjusting device for adjusting an inclination of a light controlling element used in optical scanners including those incorporated in laser printers.

2. Description of the Prior Art

There have been provided laser printers comprising an optical scanner, for example, in which a photosensitive member is horizontally scanned by light beams emitted from a light source, so that an image to be recorded is formed on the photosensitive member as a set of dots. In such an optical scanner, a single light beam is generally used to scan the photosensitive member. For improvement in a recording speed, the prior art has provided optical scanners of the multibeam type in which a multiple of light beams concurrently scan the photosensitive member.

FIG. 33 illustrates one of the conventional optical scanners of the multibeam type. Four light beams concurrently scan the photosensitive member in the shown optical scanner. More specifically, light beams emitted from four semiconductor lasers are collimated by collimator lenses 2 respectively. The collimated beams are reflected on mirrors 3 serving as light controlling elements respectively. The beams reflected on the respective mirrors 3 are further reflected on a galvanometer mirror 4 and then focused by a focusing lens 5, thereby being thrown onto a photosensitive member 6 as light beam spot. The photosensitive member 6 is moved in a direction crossing a scanning direction or in a direction of arrow X in FIG. 33. Consequently, an electrostatic latent image corresponding to image information is formed as a set of dots on the photosensitive member 6.

In the above-described optical scanner, the light beam spots of the four light beams need to be focused on the photosensitive member 6 so as to be arranged at predetermined intervals vertically with respect to the scanning direction. This requires adjustment in an inclination of the mirror 3 for adjustment of the direction in which the light beams are reflected.

One conventional inclination adjusting device for adjusting the inclination of the mirror includes a stepping motor as a driving source. The inclination adjusting device comprises an output shaft of the stepping motor and a gear reduction mechanism including a worm and worm gear. A driving force of the stepping motor is transmitted via the gear reduction mechanism to the mirror. The number of pulses supplied to the stepping motor or a rotational speed of the stepping motor and a direction of rotation thereof are controlled so that the inclination of the mirror is adjusted.

In the above-described inclination adjusting device, a resolution of rotational angle of the mirror can be improved since the output of the stepping motor is transmitted via the gear reduction mechanism to the mirror. Consequently, the inclination of the mirror can be fine-adjusted with high accuracy. However, the gear reduction mechanism including the worm and worm gear complicates the structure of the inclination control device and increases its manufacturing cost. Furthermore, a large-sized device results in a problem of dispositional limitation relative to the other parts of the photosensitive scanner. Additionally, a backlash unavoidably occurs between the worm and worm gear in the above-described gear reduction mechanism. The backlash shakes the mirror, resulting in a reduction in the accuracy of the adjusted inclination.

U.S. Pat. No. 5,610,752 to Hayakawa discloses another inclination adjusting device. As shown in FIG. 34, the device comprises a mirror 3 fixed to a magnet 8 rotatably mounted on a holder 7. A yoke 10 including a coil 9 and a magnetic member is provided around the magnet 8. In an initial state, that is, when the coil 9 is deenergized, an attractive force between the magnet 8 and the yoke 10 locates the mirror 3 so that the mirror crosses the sides of the yoke 10. Upon energization of the coil 9, a magnetic field induced in the coil rotates the magnet 8. Accordingly, the energization of the coil 9 is controlled for adjustment of the direction, magnitude, etc. of the magnetic field, so that the inclination of the mirror 3 is adjusted.

In the above-described device, however, the mirror 3 is surrounded by the coil 9 and the yoke 10. This construction results in an increase in the size of the device. Furthermore, the mirror 3 returns to its initial position when the coil 9 is deenergized. The coil 9 needs to be continuously energized so that the mirror 3 is held in a predetermined inclination. Moreover, the magnet 8 is allowed to be rotated even while the coil 9 is energized. For example, when the device is subjected to an external force such as vibration, rotation of the magnet 8 changes the inclination of the mirror 3.

SUMMARY OF THE INVENTION

Aspects of the present invention relate generally to inclination adjustment for light control as used in optical scanning devices.

The invention also provides an inclination adjusting device comprising an ultrasonic motor including a stator provided with a piezoelectric element and a rotor rotated by a traveling wave generated in the stator, and a light controlling element provided on the rotor so that an inclination thereof is adjusted according to rotation of the rotor.

The ultrasonic motor can accurately adjust the inclination of the light controlling element since it has a high resolution of rotor rotation angle. Furthermore, the inclination of the light controlling element is adjusted according to the rotation of the rotor without the conventionally used gear reduction mechanism. The construction of the inclination adjusting device can be simplified and the size thereof can be reduced.

In the ultrasonic motor, the traveling wave is generated in the stator while the latter is pressed against the rotor, so that a frictional force between the stator and the rotor causes the rotor to rotate. In view of this, the device further comprises a rotor presser for pressing the rotor against the stator or stator presser for pressing the stator against the rotor. In this construction, a large frictional force can be obtained without slippage and backlash in the rotor and/or stator. Consequently, the accuracy in the adjustment of inclination of the light control element can be improved.

The inclination adjusting device further comprises a rotational shaft provided on the rotor, a pedestal having a concavity in which the rotational shaft is rotatably mounted, and a shaft presser for pressing the rotational shaft against the pedestal. Since the rotor is rotated without slippage and backlash in this construction, the accuracy in the adjustment of inclination of the light controlling element can improved.

The inclination adjusting device further comprises a rotor support for supporting the rotor and a stator mount on which the stator is mounted. The rotor support and the stator mount are discrete from each other. In this construction, the location of the stator mount is adjusted relative to the rotor support so that the stator is positioned relative to the rotor. Consequently, the stator and the rotor can be positioned readily and reliably.

The light controlling element comprises a mirror, a half mirror, a prism, or a dichroic mirror. In the prism, three sides thereof serve as light transmitting or reflecting faces. In such a case, the inclination adjusting device further comprises a pivot shaft. The prism has one of opposite ends connected to the rotor and the other end supported on the pivot shaft. Furthermore, the device further comprises a pivot shaft support for supporting the pivot shaft for an axial movement and pivot shaft presser for pressing the pivot shaft against the prism. The pivot shaft or the prism can be prevented from backlash.

The inclination adjusting device further comprises a motor mount on which the ultrasonic motor is mounted, a holder provided on the motor mount for rockably holding the light controlling element, an abutting member abutting a portion of the light controlling element spaced away from a center of rocking motion, the abutting member being displaced by rotation of the rotor. In this construction, the abutting member is displaced so that an inclination of the light controlling element is adjusted.

According to the above-described construction, rotation of the rotor displaces the abutting member, so that the inclination of the light controlling element is varied. An amount of variation in the inclination of the element relative to an amount of rotation of the rotor is rendered smaller in this construction than in the construction in which the light controlling element is provided on the rotor such that an amount of rotation of the rotor is equal to an amount of variation in the inclination of the light controlling element. Consequently, the accuracy in the adjustment of the inclination of the light controlling element can further be improved. Furthermore, the motor is energized when the abutting member is displaced. However, the motor need not be energized to maintain the inclination of the light controlling element. Consequently, an electric power saving can be achieved.

The holder preferably includes a supporter for supporting the light controlling element and light controlling element presser for pressing the light controlling element against the abutting member. The light controlling element is usually pressed against the abutting member by the light controlling element presser. Consequently, the inclination of the light controlling element can be prevented from being changed by an external force applied to the device.

The invention further provides an inclination adjusting device comprising a mount, a controlled member, a holder provided on the mount for rockably holding the controlled member, an abutting member abutting a portion of the controlled member spaced away from a center of rocking motion, and a displacer provided on the mount for displacing the abutting member so that an inclination of the controlled member is adjusted.

The displacer may comprise a rotary actuator or a linear actuator.

Another embodiment of the present invention includes an optical scanner comprising a light emitting element, which emits a light beam, an inclination adjusting element and a scanning element. The inclination adjusting element includes a light controlling element, which adjusts an optical path of the light beam emitted by the light emitting element, a mount, and a holding member provided on the mount for rockably holding the light controlling element. In addition, the inclination adjusting element also includes an abutting member abutting a portion of the light controlling element spaced away from a center of rocking motion, a pressing element, which presses the light controlling element against the abutting member, and an actuator provided on the mount. The actuator is provided for displacing the abutting member in abutment with the light controlling element so that a distance between the portion of the light controlling element abutted against the abutting member and the center of rocking motion is varied.

Another embodiment of the present invention includes an inclination adjusting device for a light controlling element. In this embodiment, the inclination adjusting device comprises a light controlling element, a mount, a holding member, an abutting member, a pressing element, and an actuator. The holding member is provided on the mount for rockably holding the light controlling element, and the abutting member is provided for abutting a portion of the light controlling element spaced away from a center of rocking motion. The pressing element presses the light controlling element against the abutting member. The actuator is provided on the mount for displacing the abutting member in abutment with the light controlling element so that a distance between the portion of the light controlling element abutted against the abutting member and the center of rocking motion is varied. Through this variance, the inclination of the light controlling element is adjusted.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 1 is a partially broken plan view of the mirror inclination adjusting device of a first embodiment in accordance with the present invention;

FIG. 2 is a front view of the mirror inclination adjusting device;

DETAILED DESCRIPTION OF THE PREFERRED EMBODIMENTS

Figure 3:
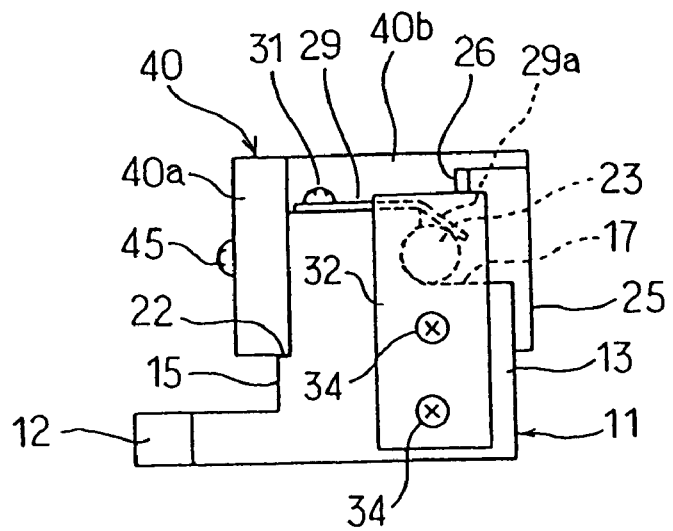
FIG. 3 is a right-hand side view of the mirror inclination adjusting device.

Several embodiments of the present invention will be described with reference to FIGS. 1 to 32. The invention is applied to an inclination adjusting device for adjusting the inclination of a light controlling element incorporated in an optical scanner for a laser printer. The optical scanner is conventional and accordingly, the description thereof will be eliminated.

The first embodiment will be described with reference to FIGS. 1 to 6. In the first embodiment, the inclination adjusting device adjusts the inclination of a mirror serving as the light controlling element. Referring to FIGS. 1 and 2, the mirror inclination adjusting device is shown. The adjusting device comprises a base 11 including a base plate 12, left-hand and right-hand walls 13 and 14 formed integrally on an upper face of the base plate 12, and a rear wall 15. The base plate 12 has left-hand and right-hand mounting concavities 16 formed in a portion of the base 11 in the backside of the rear wall 15 or a rear edge thereof. A mount (not shown) provided in the optical scanner is mounted on the base 11 by screws screwed through the concavities 16.

Figure 5:
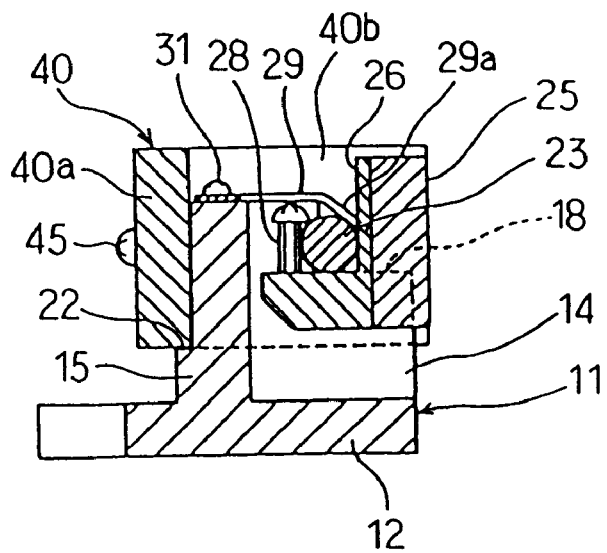
FIG. 5 is a longitudinal section taken along line 5—5 in FIG. 1.
Figure 6:
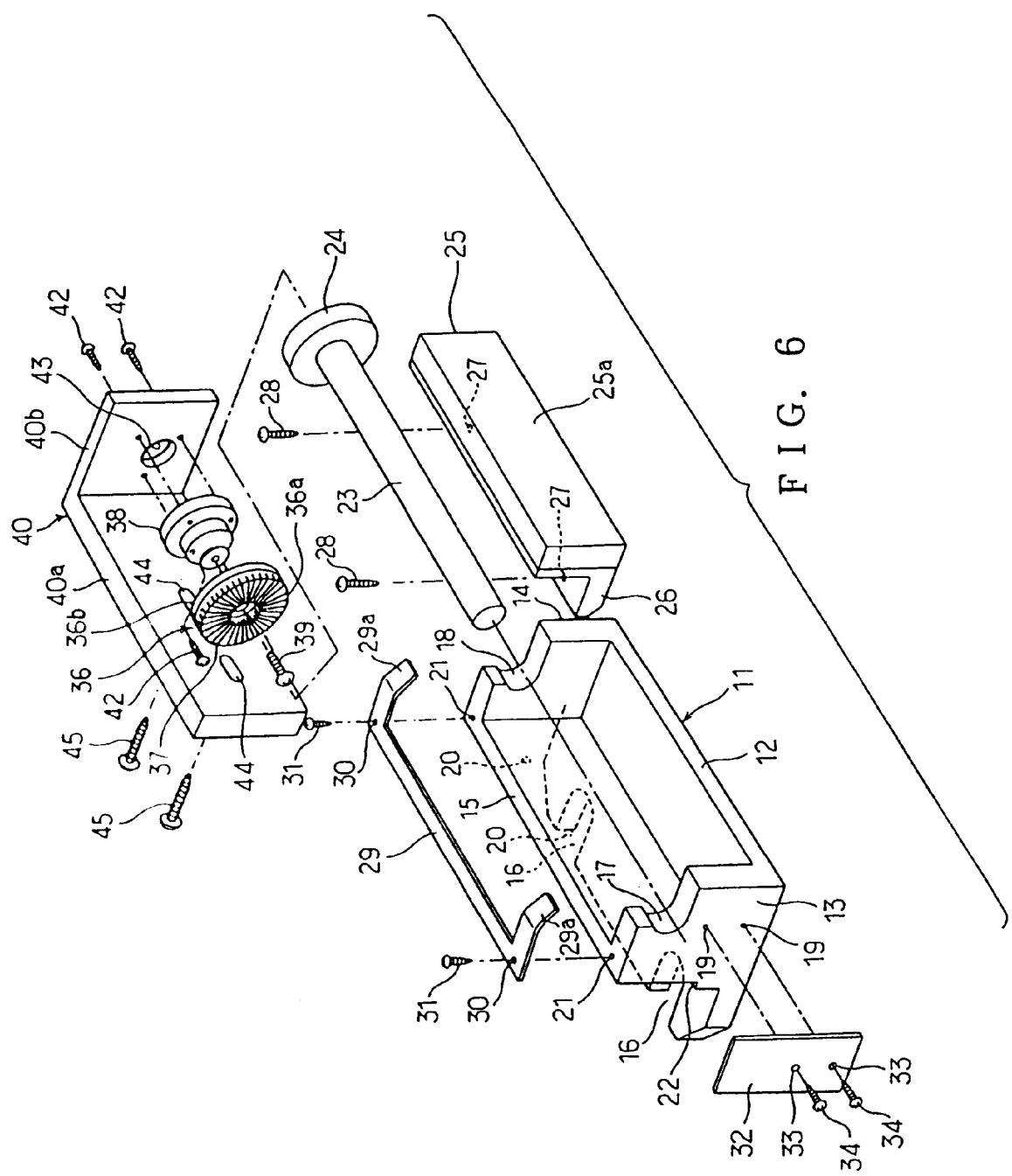
FIG. 6 is an exploded perspective view of the mirror inclination adjusting device.

The walls 13 and 14 have concavities 17 and 18 formed in the upper front faces thereof respectively. Opposite ends of a rotational shaft 23 having a circular section are received in the concavities 17 and 18 respectively. A disc-shaped rotor 24 is mounted on a right-hand distal end of the rotational shaft 23 located in the right of the right-hand wall 14. A rectangular mirror 25 is mounted on a portion of the shaft 23 located between the walls 13 and 14. The mirror 25 has a mirror finished surface 25a formed by polishing a metal, for example. The mirror 25 is mounted on an L-shaped mirror mounting plate 26 further mounted on the shaft 23. More specifically, the mirror 25 has a rear face 25b opposite to the mirror finished surface 25a and bonded to a side face of the mirror mounting plate 26, for example, as shown in FIGS. 5 and 6. The mirror mounting plate 26 is disposed along the shaft 23 as shown in FIGS. 5 and 6, and two screws 28 are screwed into screw holes 27 formed in the plate 26 respectively, so that the plate 26 is fixed to the shaft 23. The plate 26 and the shaft 23 thus constitute a mounting member in the invention.

An elongated leaf spring 29 serving as rotational shaft presser is fixed by screws 31 to the upper faces of the left-hand and right-hand and rear walls 13, 14 and 15. Screw holes 21 are formed in corners between the rear wall 15 and the left-hand and right-hand walls 13 and 14 respectively, as shown in FIG. 6. The leaf spring 29 has two mounting holes 30 formed to correspond to the screw holes 21 respectively. The screws 31 are screwed through the mounting holes 30 into the screw holes 21 respectively.

The leaf spring 29 has both ends bent obliquely downward so as to serve as pressing portions 29a respectively. The pressing portions 29a radially press the shaft 23 accommodated in the concavities 17 and 18 against the walls 13 and 14 respectively. As a result, the shaft 23 is rotatably mounted on the walls 13 and 14. The leaf spring 29 prevents detachment of the shaft 23 from the concavities 17 and 18. Accordingly, the walls 13 and 14 (the base 11) serves as a pedestal for supporting the shaft 23 and also as a rotor support for supporting the rotor 24 and the shaft 23 integrated therewith.

A rectangular leaf spring 32 is mounted on the outer face of the left-hand wall 13 by screws 34 as shown in FIG. 3. The outer face of the wall 13 is formed with two vertically aligned screw holes 19 located lower than the concavity 17 as shown in FIG. 6. The leaf spring 32 has two mounting holes 33 formed to correspond to the screw holes 19 respectively. The screws 34 are screwed through the mounting holes 33 into the screw holes 19 respectively so that an upper free end of the leaf spring 32 abuts against the left-hand end face of the shaft 23 to thereby press the shaft toward the rotor 24 side.

A generally L-shaped stator mount 40 is mounted on the back of the rear wall 15 as shown in FIGS. 1 and 2. The stator mount 40 includes a fixed section 40a fixed to the back of the rear wall 15 and a stator mounting section 40b spaced away from the rotor 24. The back of the rear wall 15 is formed with a stepped portion 22 and two screw holes 20 over the stepped portion as shown in FIGS. 3 and 6. The fixed portion 40a of the stator mount 40 is formed with two elliptic mounting holes 44 corresponding to the respective screw holes 20. The fixed section 40a is placed on the stepped portion 22 and two screws 45 are then screwed through the mounting holes 44 into the screw holes 20 respectively so that the stator mount 40 is mounted on the rear wall 15.

Figure 4:
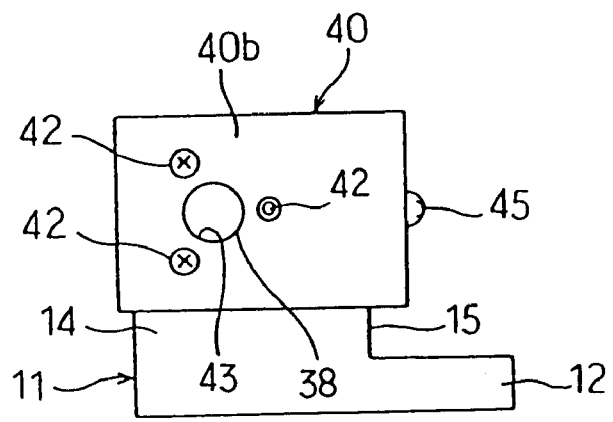
FIG. 4 is a left-hand side view of the mirror inclination adjusting device.

A mounting piece or attachment 38 is attached to the stator mounting section 40b of the stator mount 40 as shown in FIGS. 1 and 2. The mounting piece 38 has a central flange 38a with opposite ends having two integrally formed protrusions 38b and 38c respectively. The stator mounting section 40b has a through hole 43 in which the protrusion 38c is fitted. The flange 38a is fixed to the stator mounting section 40b, for example, by three screws 42, so that the mounting piece 38 is attached to the stator mounting section 40b. One of the screws 42 is screwed from the mounting piece 38 side, whereas the other two screws 42 are screwed from the stator mounting section 40b side, as shown in FIGS. 4 and 6.

A stator 36 is mounted on a distal end of the protrusion 38b of the mounting piece 38 by a screw 39 as shown in FIGS. 1 and 2. The stator 36 includes a ring oscillator 36a having a central stepped through hole 36c and a number of piezoelectric elements 36b attached to an outer circumferential edge of a side of the oscillator 36a located at the stator mounting section 40b side. The hole 36c has an annular protrusion extending from the inner face thereof located at the side of the oscillator 36a to which the piezoelectric elements 36b are attached. Accordingly, when the screw 39 is screwed through the hole 36c into the screw hole 38c of the mounting piece 38, the head of the screw 39 abuts the annular protrusion 41 so that the stator 36 is prevented from falling off. Since the mounting holes 44 are elliptic as described above, the fixed section 40a is moved to thereby move the mounting holes 44 leftward or rightward relative to the respective screw holes 20, so that the location of the stator 36 can be adjusted relative to the rotor 24.

The location of the stator mount 40 or the stator mounting section 40b is set as follows. The locations of the mounting holes 44 are adjusted relative to the respective screw holes 20 so that the rotor 24 is pressed by the stator 35 such that the left-hand end of the shaft 23 projects a suitable amount outward from the left-hand wall 13. Consequently, the shaft 23 is urged by the spring force of the leaf spring 32 axially rightward or toward the stator 36 side, whereupon the rotor 24 is pressed against the stator 36. The pressing causes a suitable frictional force between the rotor 24 and the stator 36. The rotor 24 and the stator 36 constitute an ultrasonic motor 35 in the invention. The leaf spring 32 serves as rotor presser for pressing the rotor 24 against the stator 36.

When voltage is applied to the piezoelectric elements 36b, the oscillator 36a generates traveling waves, which rotate the rotor 24 pressed against the oscillator 36a or the shaft 23. The mirror 25 provided on the shaft 23 is also rotated such that an inclination or angle of the mirror 25 is changed relative to the base plate 12. Accordingly, an amount of rotation of the shaft 23 (rotation angle) or the inclination of the mirror 25 can be adjusted by controlling the voltage applied to the piezoelectric elements 36b. Since the ultrasonic motor 35 comprising the rotor 24 and the stator 36 has a high resolution of rotation angle of the rotor, the inclination of the mirror 25 can be adjusted with accuracy. Furthermore, provision of the ultrasonic motor eliminates the conventionally used gear reduction mechanism including the worm and worm gear. Consequently, the device can be simplified and reduced in the size thereof and accordingly, the manufacturing cost can be reduced. Additionally, since the elimination of the gear reduction mechanism prevents backlash of the mirror 25, the accuracy in the adjusted inclination thereof can further be improved.

The electric power consumption in the piezoelectric elements 36b of the motor 35 is reduced as compared with the conventional inclination adjusting device comprising a pulse motor serving as a driving source. Consequently, an electric power saving can be achieved. Furthermore, since the rotor 24 continuously presses the stator 36 even while the motor is deenergized, inadvertent rotation of the rotor 24 by the frictional force between the stator 36 and the rotor can be prevented. Consequently, further electric power saving can be achieved as compared with the prior art in which voltage needs to be applied to the coil 9 so that the inclination of the mirror is maintained.

The leaf spring 29 presses the shaft 23 against the concavities 17 and 18. The other leaf spring 32 presses the rotor 24 against the stator 36. consequently, a further improvement in the accuracy of adjusted inclination of the mirror 25 can be achieved without backlash of the shaft 23 and slippage and/or backlash between the rotor 24 and the stator 36.

The base 11 serving as both the pedestal and the rotor support is discrete from the stator mount 40. Accordingly, the position of the stator mount 40 is adjusted relative to the base 11 so that the rotor 24 can readily and reliably press the stator 36.

Figure 7:
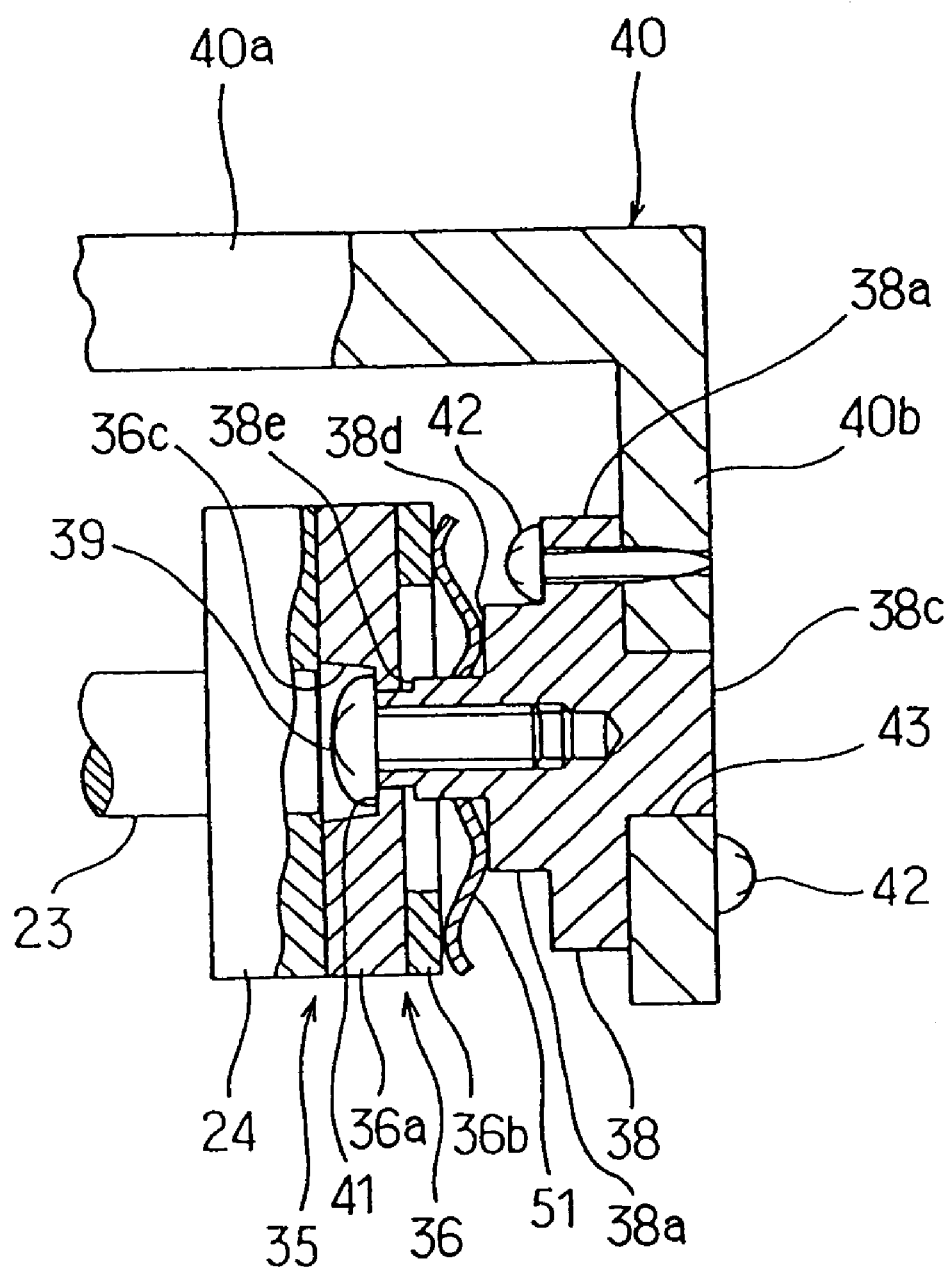
FIG. 7 is a transverse section of the motor and mounting piece employed in the mirror inclination adjusting device of a second embodiment in accordance with the invention.

FIG. 7 illustrates a second embodiment of the invention. The differences between the first and second embodiments will be described. Identical or similar parts in the second embodiment are labeled by the same reference symbols as in the first embodiment. In the second embodiment, the stator 36 presses the rotor 24 although the rotor 24 presses the stator 36 in the first embodiment. The protrusion 38b of the mounting piece 38 has two stepped portions 38d and 38e so as to be stepwise. The mounting piece 38 is so dimensioned that the length between the stepped portion 38e and the other end face thereof opposite the stepped portion is larger than the thickness of the annular protrusion 38 of the oscillator. As a result, the stator 36 is axially movable when mounted on the left-hand end of the mounting piece 38.

A leaf spring 51 serving as a stator presser is disposed between the stepped portion 38d of the mounting piece 38 and the piezoelectric elements 36. As the result of this disposition, the stator 36 presses the rotor 24. Although not shown in the drawings, a stopper is provided for receiving the end of the shaft 23 at the left-hand wall 13 side, instead of the leaf spring 32. This limits the leftward movement of the shaft 23.

The construction of the inclination adjusting device other than described above is the same as that in the first embodiment. Consequently, the same effects can be achieved in the second embodiment as in the first embodiment.

Figure 8:
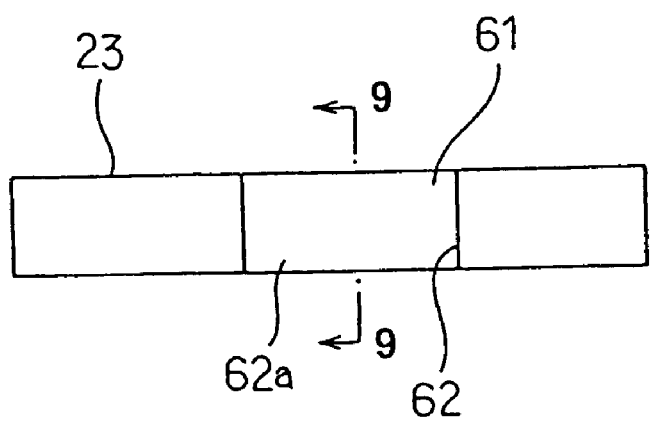
FIG. 8 is a front view of a rotational shaft and a mirror employed in the mirror inclination adjusting device of a third embodiment in accordance with the present invention.
Figure 9:
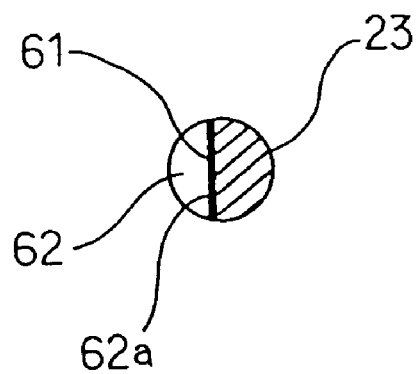
FIG. 9 is a longitudinal section taken along line 9—9 FIG. 8.

FIGS. 8 and 9 illustrate a third embodiment of the invention. The differences between the first and third embodiments will be described. Identical or similar parts in the third embodiment are labeled by the same reference symbols as in the first embodiment. Although the mirror 25 is mounted on the mirror mounting plate 26 further mounted on the shaft 23 in the first embodiment, the shaft 23 is formed with a mirror 61 in the third embodiment. More specifically, the shaft 23 has an axially central concavity 62.

The concavity 62 includes an inner side face 62a extending along the shaft 23. The inner side face 62a is polished into a smooth face, which is thereafter plated into the mirror 61. Accordingly, the shaft 23 serves as the mounting member in the invention. Alternatively, a synthetic resin may be caused to adhere to the inner side face 62a by die casting and thereafter plated. In the third embodiment, the number of used parts can be reduced and a further reduction in the manufacturing cost can be achieved.

FIGS. 10 to 13 illustrate a fourth embodiment of the invention. The differences between the first and fourth embodiments will be described. Identical or similar parts in the fourth embodiment are labeled by the same reference symbols as in the first embodiment. In the fourth embodiment, the invention is applied to an inclination adjusting device for adjusting the inclination of a half mirror 71 serving as the light controlling element, instead of the mirror 25.

Figure 13A:
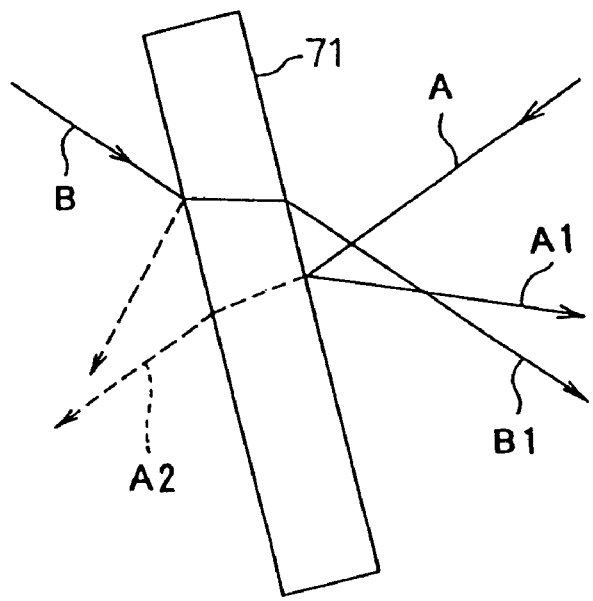
FIG. 13A shows the directions of the lights passing through and reflected on the half mirror when reflected light A1 of light beam A is shifted from transmitted light B1 of light beam B.
Figure 13B:
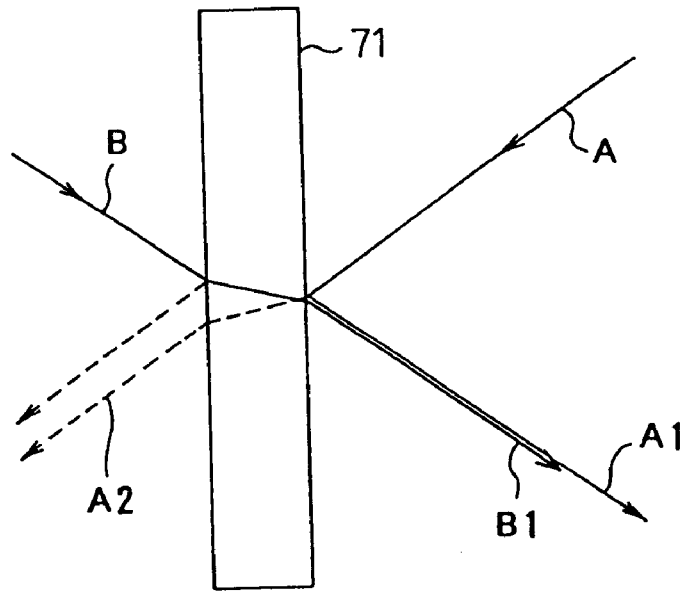
FIG. 13B shows the directions of the lights passing through and reflected on the half mirror when reflected light A1 of light beam A corresponds with transmitted light B1 of light beam B.

Prior to the description of the device, the half mirror 71 will be described briefly with reference to FIGS. 13A and 13B. The half mirror 71 reflects one half of light beam incident thereon and transmits the other half of light beam therethrough. For example, when light beam A is incident on the half mirror 71, one half of the light beam A serves as a reflected light A1 and the other half of the light beam A serves as a transmitted light A2, as shown in FIG. 13A. The transmitted light A2 goes in the same direction in which the light beam A does, whereas the reflected light A1 goes in a direction changed according to an angle of incidence of the light beam A onto the mirror 71. As obvious from the comparison between FIGS. 13A and 13B, when the inclination of the mirror 71 is changed, the direction of the reflected light A1 is changed although that of the transmitted light A2 is not changed. Accordingly, when two light beams A and B are irradiated on the respective sides of the mirror 71, the inclination of the mirror 71 can be adjusted so that the reflected light Al of the light beam A and the transmitted light B2 of the light beam B are parallel with each other and are converged substantially into a single beam, as shown in FIG. 13B.

The inclination adjusting device will now be described with reference to FIGS. 10 to 12. A pair of supports 73 and 74 serving as the pedestal (rotor support) are fixed by screws 75 to a flat base 72. The supports 73 and 74 are formed with concavities 76 and 77 which are the same as the concavities 17 and 18 in the first embodiment, respectively. Both ends of the shaft 23 are accommodated in the concavities 76 and 77 respectively. Two leaf springs 78 and 79 both serving as shaft pressers are mounted on upper faces of the supports 73 and 74 by screws 80. The leaf springs 78 and 79 include pressing portions 78a and 79a in the distal ends respectively as the leaf spring 29 in the first embodiment. The shaft 23 is pressed against the concavities 78 and 79 by the respective pressing portions 78a and 79a.

Figure 10:
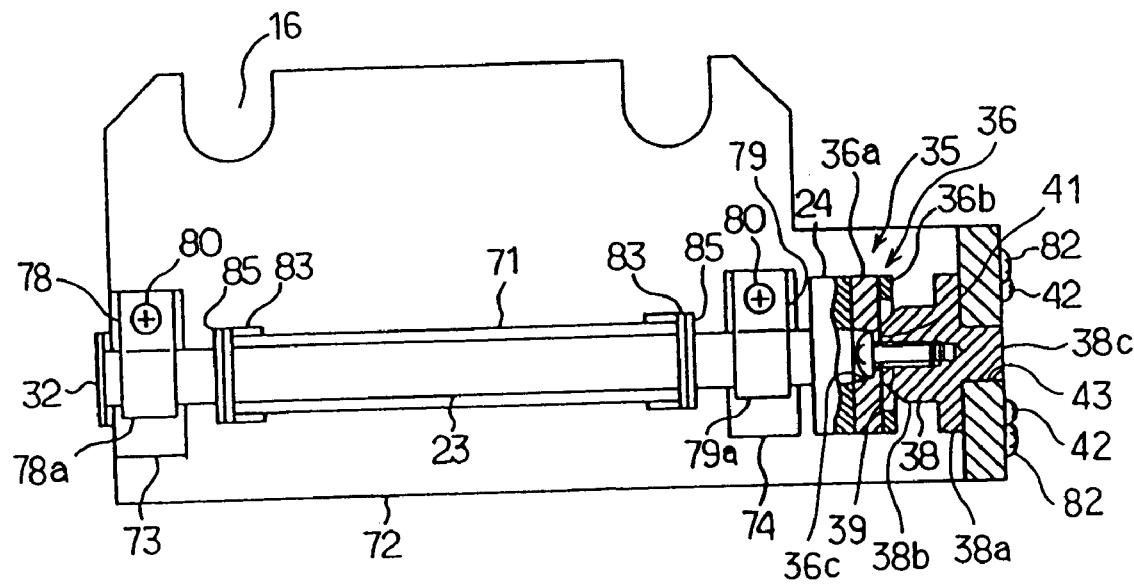
FIG. 10 is a view similar to FIG. 1, showing the mirror inclination adjusting device of a fourth embodiment in accordance with the invention.
Figure 11:
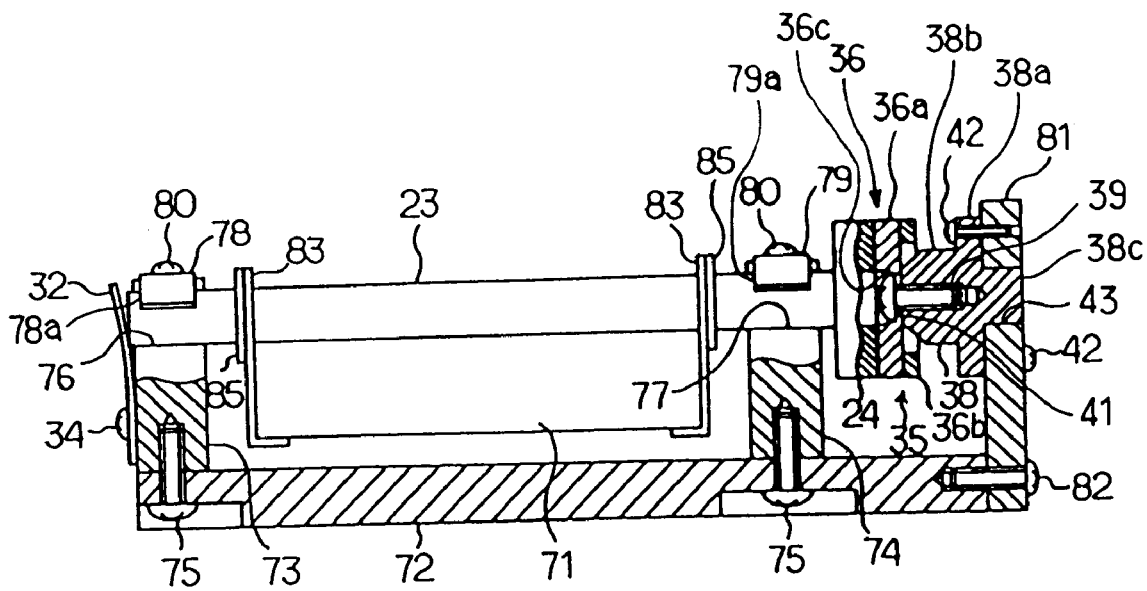
FIG. 11 is a partially broken view of the mirror inclination adjusting device.
Figure 12:
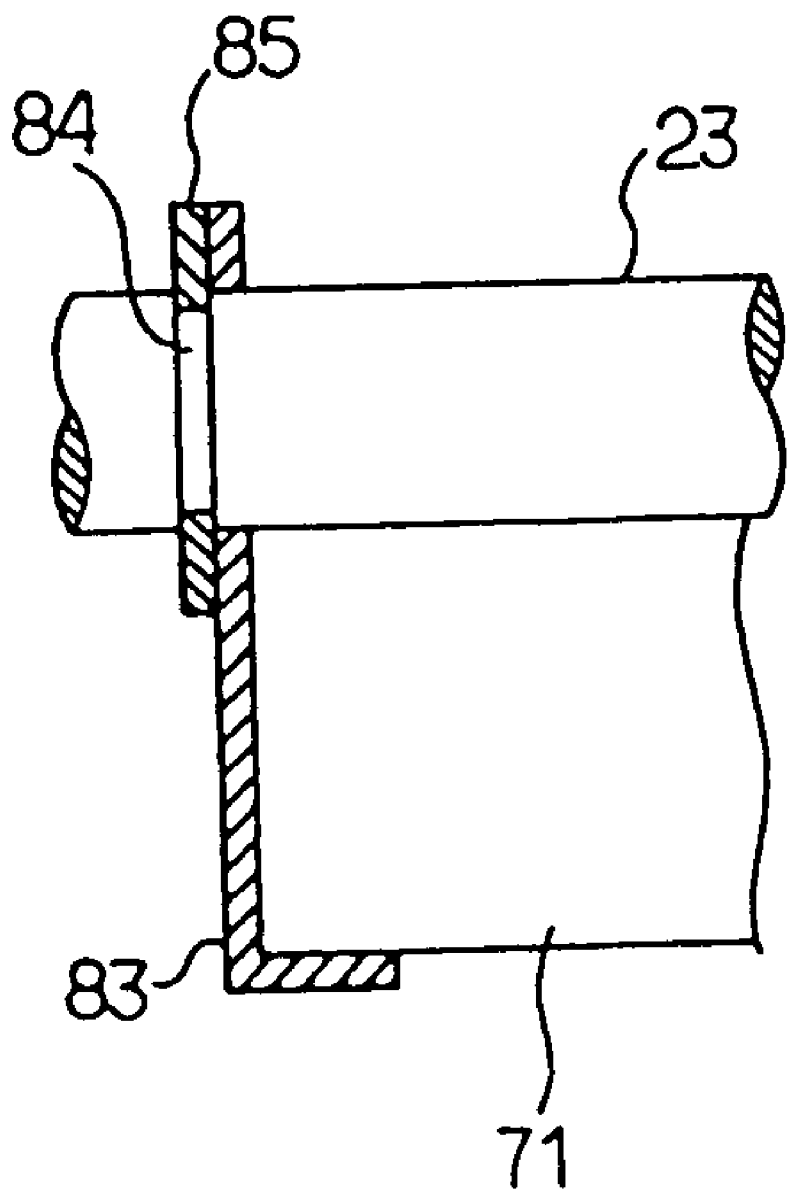
FIG. 12 is a partial front view of the rotational shaft and the half mirror.

A flat stator mount 81 is fixed to the right-hand end of the base 72 by screws 82 as viewed in FIGS. 10 and 11. The mounting piece 38 is fixed to the stator mount 81 by screws 41 and 42 in the same manner as in the first embodiment. The leaf spring 32 is also fixed to the left-hand support 73. The shaft 23 is thus urged toward the stator 37 such that the rotor 24 is pressed against the stator 37.

The shaft 23 is inserted through a pair of generally L-shaped leaf springs 83. The shaft 23 has a pair of axially spaced grooves 84 one of which is shown in FIG. 12. Two snap rings 85 are fitted in the grooves 84 to prevent the leaf springs 83 from falling off respectively. Accordingly, the spring forces of the leaf springs 83 press the upper end face of the half mirror 71 against the shaft 23. In this state, the half mirror 71 is held between the leaf springs 83. As a result, the half mirror 71 is rotated together with the shaft 23.

According to the fourth embodiment, the half mirror 71 is fitted between the leaf springs 83. Thus, the half mirror 71 can readily be mounted on the shaft 23. The inclination adjusting device of the fourth embodiment is constructed so that both sides of the half mirror 71 are prevented from being covered with other members in order that incidence and reflection of the light beams A and B may be allowed. This construction can be applied to the device of the first embodiment adjusting the inclination of the mirror 25.

The leaf springs 83 exert the spring forces on the half mirror 71 such that the latter is rotated together with the shaft 23. A pair of plate-shaped members may be used to hold the half mirror 71 therebetween, instead of the leaf springs 83. In this case, the half mirror 71 is preferably bonded to the plate-shaped members and the shaft 23.

Figure 14:
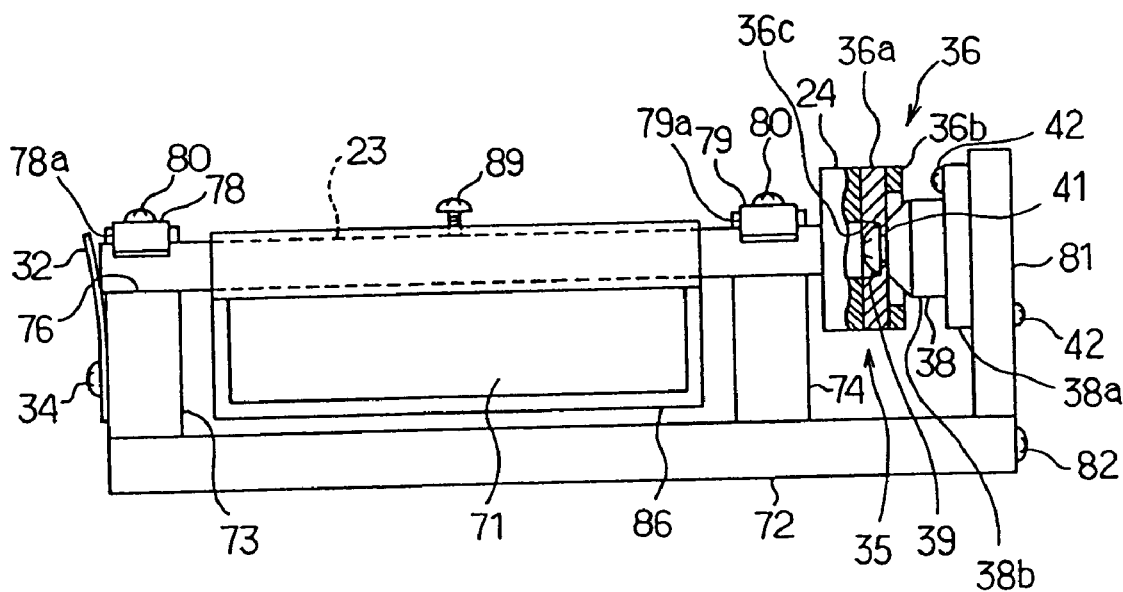
FIG. 14 is a partially broken front view of the mirror inclination adjusting device of a fifth embodiment in accordance with the invention.
Figure 15:
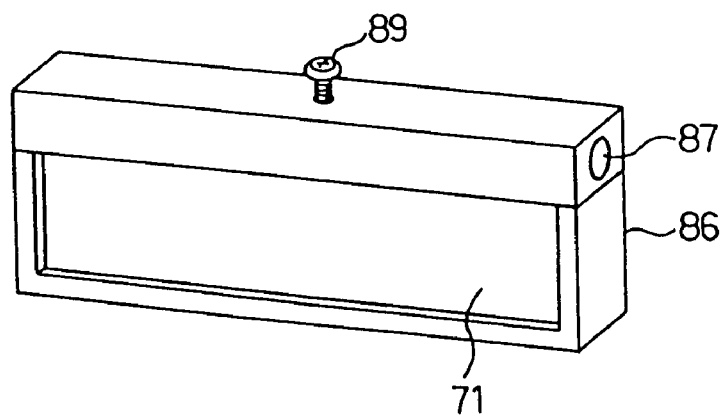
FIG. 15 is a perspective view of the half mirror and the mounting frame with the rotational shaft being removed.
Figure 16:
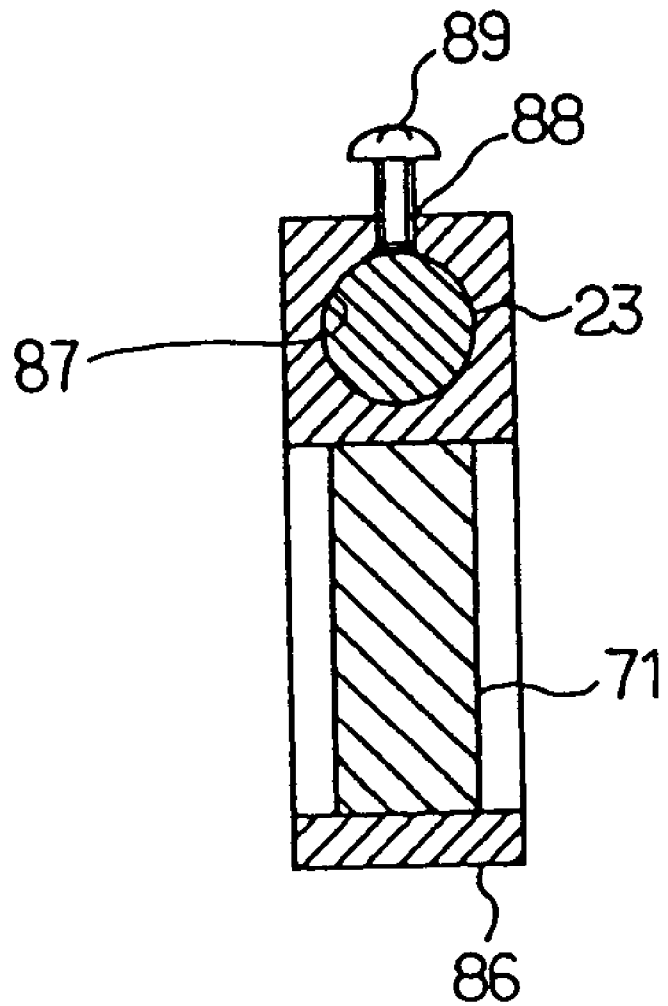
FIG. 16 is a longitudinal section of the mounting frame and the half mirror.

FIGS. 14 to 16 illustrate a fifth embodiment of the invention. The differences between the fourth and fifth embodiments will be described. Identical or similar parts in the fifth embodiment are labeled by the same reference symbols as in the fourth embodiment. The fifth embodiment is directed to another construction for the mount of the half mirror 71 on the shaft 23. The half mirror 71 is fitted into a rectangular mounting frame 86 serving as the mounting member to be fixed thereto by means of bonding. The mounting frame 86 has in its upper side a through hole 87 through which the shaft 23 is inserted. The upper side of the mounting frame 86 further has in its upper face a screw hole 88 (shown only in FIG. 16) extending to the hole 87. The shaft 23 is inserted through the hole 87 and a screw 89 is screwed into the screw hole 88 to be tightened against the shaft 23, so that the mounting frame 86 is fixed to the shaft 23.

The above-described mounting of the frame 86 onto the shaft 23 is carried out prior to the mounting of the shaft on the supports 73 and 74. When the half mirror 71 is previously mounted on the frame 86 as described above, the workman can mount the half mirror 71 on the shaft 23 without touching the former. Consequently, the half mirror 71 can be prevented from being soiled by hand grease etc. during the mounting work.

Figure 17:
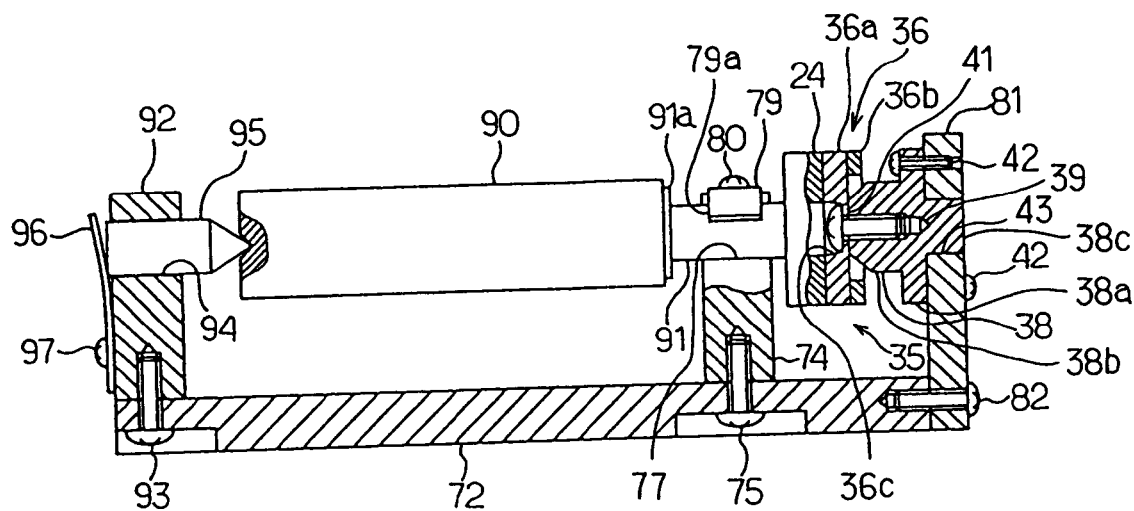
FIG. 17 is a partially broken front view of the prism inclination adjusting device of a sixth embodiment in accordance with the invention.
Figure 18:
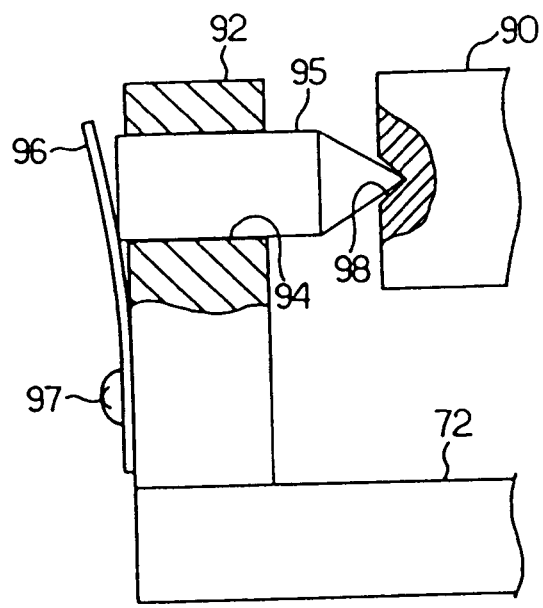
FIG. 18 is a partially broken front view showing the pivot shaft employed in the prism inclination adjusting device.
Figure 19:
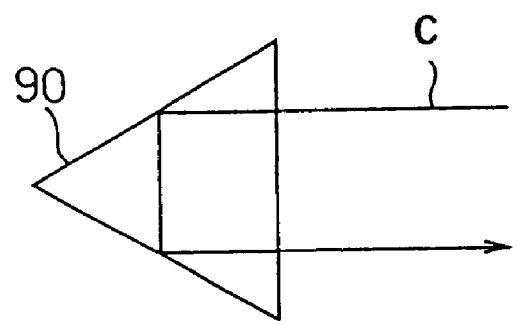
FIG. 19 shows the prism on which the light beam is reflected.

FIGS. 17 to 19 illustrate a sixth embodiment of the invention. The differences between the fourth and sixth embodiments will be described. Identical or similar parts in the sixth embodiment are labeled by the same reference symbols as in the fourth embodiment. In the sixth embodiment, the invention is applied to an inclination adjusting device for adjusting the inclination of a prism 90 serving as the light controlling element, instead of the half mirror 71.

A support 92 serving as a pivot support is fixed to the base 72 by a screw 93, instead of the support 73. The support 92 has a through hole 94 formed in its upper portion. One end of a pivot shaft 95 is fitted into the hole 94. The other end of the pivot shaft 95 is tapered. A leaf spring 96 serving as a pivot shaft presser is fixed to the support 92 by a screw 97. The pivot shaft 95 is pressed by a free upper end of the leaf spring 96.

A rotational shaft 91 is accommodated in the concavity 77 of the support 74. The rotor 24 is mounted on one end of the shaft 91. The shaft 91 has the other end formed with a disc portion 91a to which one end face of the prism 90 is bonded or otherwise, secured. The prism 90 has a conical concavity 98 formed in the central portion of the other end face thereof. The distal end of the tapered end of the pivot shaft 95 is inserted in the concavity 98 so that the prism 90 is rotatably mounted between the supports 74 and 92. The spring force of the leaf spring 96 pressing the end of the pivot shaft 95 presses the rotor 24 against the stator 37. Accordingly, the leaf spring 96 also serves as the rotor presser.

In the sixth embodiment, the prism 90 is used to change the traveling direction of the light beam C 180 degrees as shown in FIG. 19, for example. Accordingly, three sides of the prism 90 should not be covered with the other parts. One end of the prism 90 is connected to the shaft 91 and the other end thereof is supported on the pivot shaft 95. As a result, the incidence or transmittance of the light beam on or through the prism 90 is not prevented. The sixth embodiment may be applied to the mirror 25 or the half mirror 71.

Figure 20:
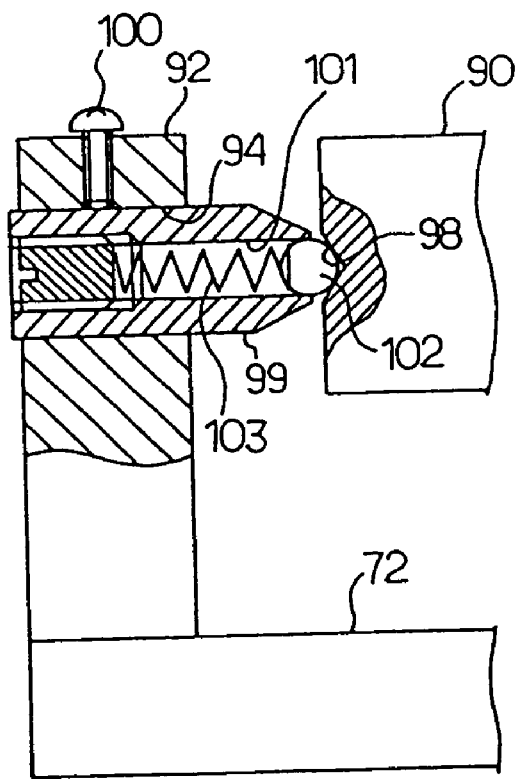
FIG. 20 is a view similar to FIG. 18, showing the prism inclination adjusting device of a seventh embodiment in accordance with the invention.

FIG. 20 illustrates a seventh embodiment of the invention. The differences between the sixth and seventh embodiments will be described. Identical or similar parts in the seventh embodiment are labeled by the same reference symbols as in the sixth embodiment. The seventh embodiment is directed to another construction for supporting the other end of the prism 90. A holder 99 is fixed in the hole 94 by a screw 100. The holder 99 is formed with a holding hole 101. A compression coil spring 103 serving as a presser is accommodated in the holding hole 101 together with a metal ball 102. The coil spring 103 presses the ball 102 such that a part thereof protrudes out of the hole 101 to be located in the concavity 98 of the prism 90. The construction of the inclination adjusting device other than described above is the same as that in the sixth embodiment. Consequently, the same effects can be achieved in the seventh embodiment as in the sixth embodiment.

Figure 21:
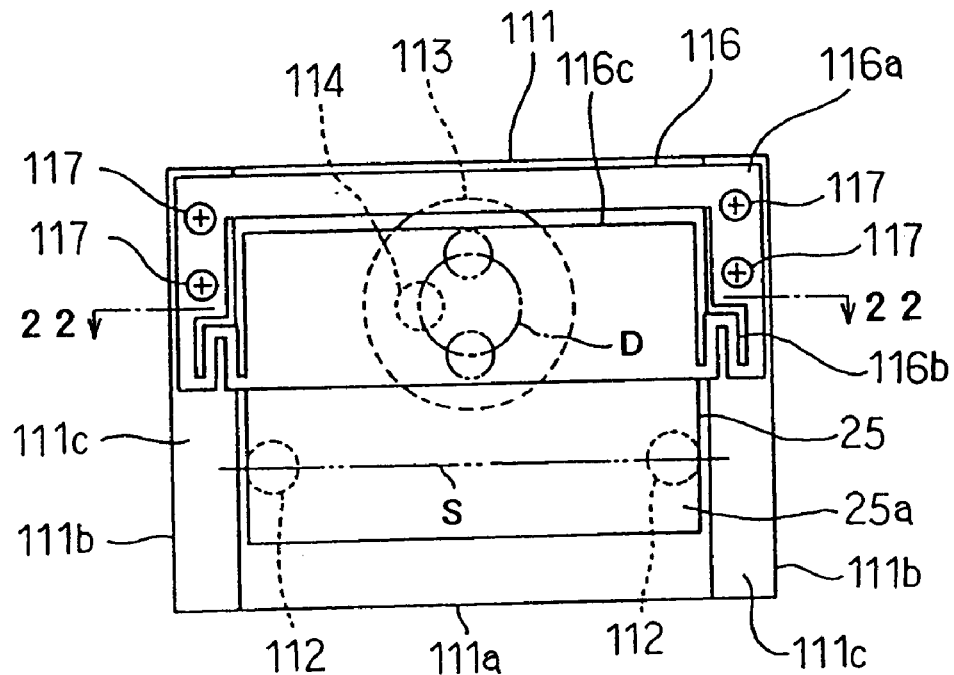
FIG. 21 is a view similar to FIG. 2, showing the mirror inclination adjusting device of an eighth embodiment in accordance with the invention.
Figure 22:
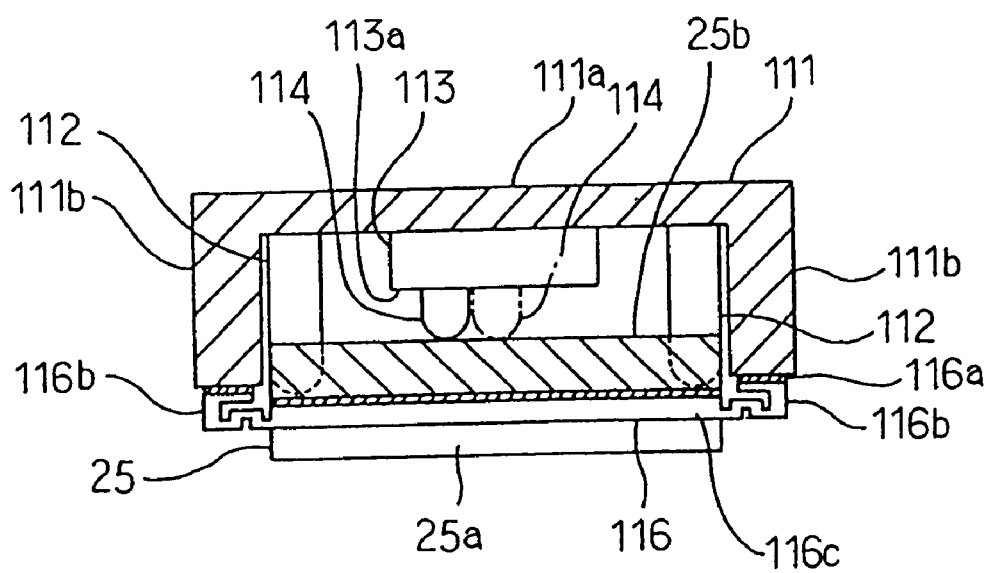
FIG. 22 is a transverse section taken along line 22—22 in FIG. 21.
Figure 23:
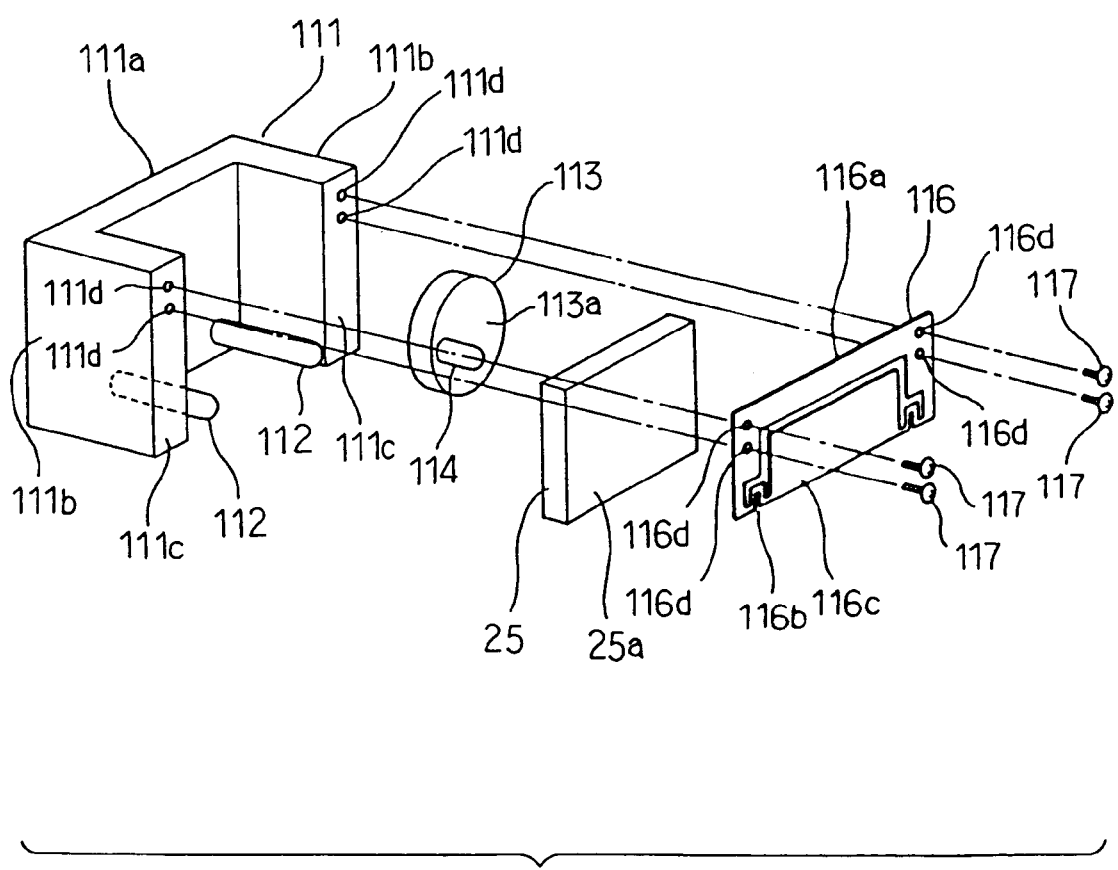
FIG. 23 is an exploded view of the adjusting device.

FIGS. 21 to 25 illustrate an eighth embodiment of the invention. The differences between the first and eighth embodiments will be described. Identical or similar parts in the eighth embodiment are labeled by the same reference symbols as in the first embodiment. The eighth embodiment differs from the first embodiment in the structure for supporting the mirror 25. Referring to FIGS. 21 to 23, a generally C-shaped support 111 serving as a motor support includes a rear wall 111a and side walls 111b integrally formed to extend forward from the left-hand and right-hand ends of the rear wall 111a respectively.

Two protrusions 112 both serving as supporters are fixed to a lower portion of the rear wall 111 so as to be spaced from each other. Each protrusion 112 has a semispherical distal end. A rotary actuator serving as a displacer or an ultrasonic motor 113 is fixed to an upper central portion of the rear wall 111. The motor 113 includes a stator provided in the rear portion thereof located at the rear wall 111a side and a rotor provided in the front portion thereof although neither of them are shown.

An abutting pin 114 serving as an abutting member is fixed to a front face 113a of the motor 113 to assume a location differing from the center of rotation of the rotor or more specifically, to be located between the center of rotation and the outer peripheral edge of the rotor. Upon drive of the motor 113, the abutting pin 114 is displaced along a circumference D shown by chain line in FIG. 21. The abutting pin 114 has a semispherical distal end. The distance between the rear wall 111a and the distal end or front end of the abutting pin 114 is set to be shorter than the distance between the rear wall 111a and the distal ends of the protrusions 112.

The mirror 25 is provided between the side walls 111b. The mirror 25 rests on the distal ends of the protrusions 112 and on the distal end of the abutting pin 114. The mirror 25 is mounted on a resilient member or a leaf spring 116 serving as a light controlling element presser, the leaf spring being further mounted on the support 111. More specifically, the leaf spring 116 is attached to the front faces 111c of the side walls 111b. The leaf spring 116 includes a generally C-shaped fixing section 116a connecting between the side walls 111b and a flat section 116c connected via spring sections 116b to opposite ends of the fixing section 116a. Each front face 111c has two screw holes 111d. The fixing section 116a has four holes 116d corresponding to the screw holes 111d of the respective front faces 111c. Four screws 117 are screwed through the holes 116d into the screw holes 111d aligned with the holes 116d respectively, so that the leaf spring 116 is fixed to the support 111.

An upper half of the mirror finished surface 25a of the mirror 25 is bonded or otherwise, fixed to the flat section 116c of the leaf spring 116. A lower half of the mirror finished surface 25a of the mirror 25 serves as a reflecting surface. Since the mirror 25 is fixed via the leaf spring 116 to the support 111 as described above, it is pressed by the distal ends of the protrusions 112 and the abutting pin 114. Accordingly, the protrusions 112 and the leafs spring 116 constitute the holder in the invention.

The distal end of the abutting pin 114 has the spherical surface as described above. Accordingly, the displacement of the abutting pin 114 caused by rotation of the motor 13 is allowed even if the leaf spring 116 presses the mirror 25 against the protrusions 112 and the abutting pins 114. As the result of the above-described construction, the mirror 25 is three-point supported by the protrusions 112 and the abutting pin 114. Furthermore, with displacement of the abutting pin 114, the mirror 25 is rocked about the straight line connecting between points on which the protrusions 112 supports the mirror, or the line S in FIG. 21. Thus, the line S is the center of the rocking motion.

Figure 24:
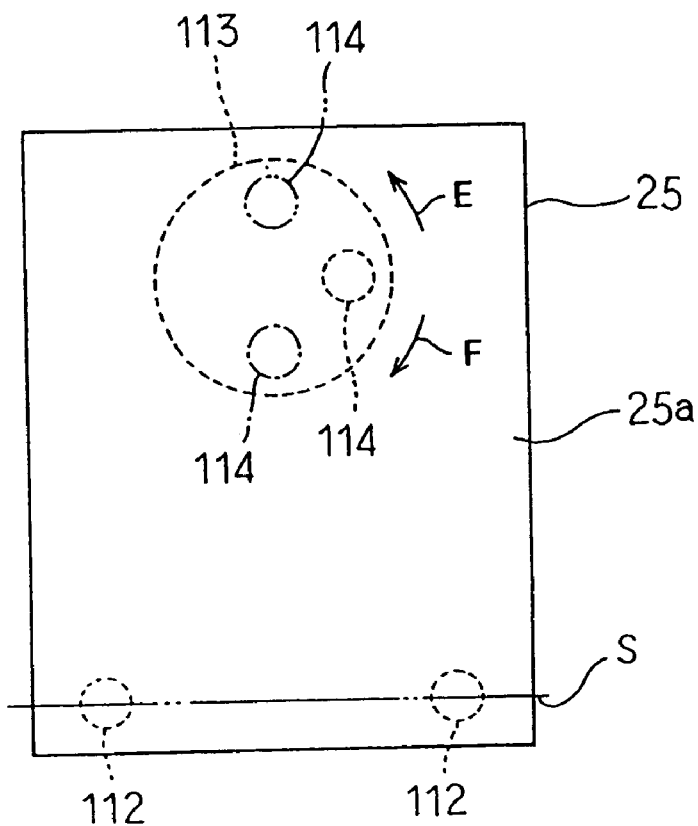
FIG. 24 is a front view schematically showing the relation among the mirror, the protrusion and the abutting member.
Figure 25:
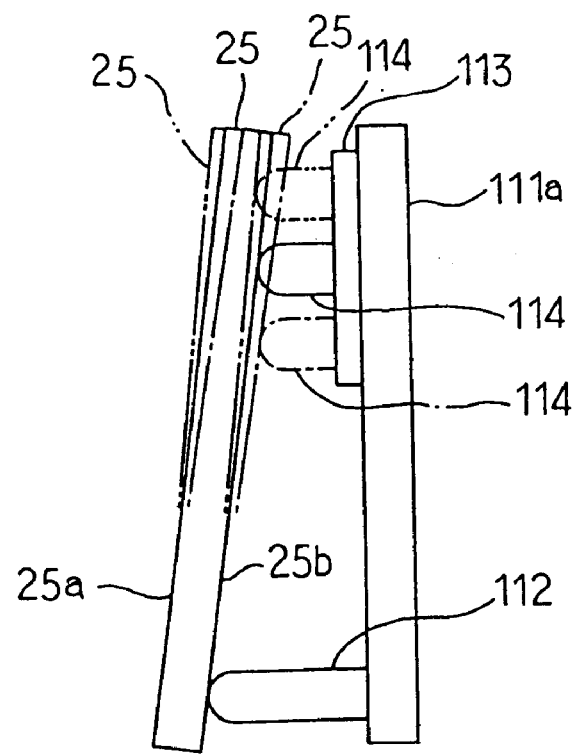
FIG. 25 is a side view schematically showing the relation among the mirror, the protrusion and the abutting member.

The operation of the inclination adjusting device of the eighth embodiment will now be described with reference to FIGS. 24 and 25. The distance between the rear wall 111a and the distal end or front end of the butting pin 114 is shorter than the distance between the rear wall 111a and the distal ends of the protrusions 112, as described above. Accordingly, the inclination of the mirror 25 relative to the rear wall 111a or the inclination of the mirror finished surface (reflecting surface) depends upon the position of the abutting pin 114. For example, assume that the pin 114 is located as shown by solid line in FIG. 25 in the initial state thereof. At this time, the inclination of the mirror 25 is shown by solid line in FIG. 25. Upon rotation of the rotor of the motor 113 in the direction of arrow E in FIG. 24, the pin 114 is displaced from the initial position to be departed from the center S of the rocking motion. Then, the distal end of the pin 114 protrudes forward (leftward in FIG. 25) relative to the initial position of the rear 25b of the mirror 25. Accordingly, the upper portion of the mirror 25 is pushed forward against the spring force of the leaf spring 116. Consequently, the inclination of the mirror 25 relative to the rear wall 111a is gradually decreased. When the pin 114 is moved to a position (shown by two dot chain line in FIGS. 24 and 25) farthest from the rocking motion center S, the inclination of the mirror 25 is shown by two-dot chain line in FIG. 25. When the rotor is further rotated in the direction of arrow E, the pin 114 comes closer to the center S again.

On the other hand, the pin 114 is displaced from the initial position to come closer to the center S when the rotor is rotated in the direction of arrow F. The distal end of the pin 114 is withdrawn rearward (rightward in FIG. 25) relative to the initial position of the rear 25b of the mirror 25. Accordingly, the spring force of the leaf spring 116 displaces the pin 114 and the upper portion of the mirror 25 gradually comes close to the rear wall 111a side. Consequently, the inclination of the mirror 25 relative to the rear wall 111a is gradually increased. When the pin 114 is moved to a position (shown by chain line in FIGS. 24 and 25) nearest to the rocking motion center S, the inclination of the mirror 25 is shown by chain line in FIG. 25. When the rotor is further rotated in the direction of arrow F, the pin 114 departs from the center S again.

According to the eighth embodiment, the abutting pin 114 abutting the mirror 25 is displaced according to the rotation of the rotor. The inclination of the mirror 25 is adjusted on the basis of the displacement of the pin 114. Consequently, the adjustment of inclination can be rendered more accurate in the eighth embodiment as compared with the first embodiment in which the mirror 25 is mounted on the rotor 24 so that an amount of rotation of the rotor is directly an amount of change in the inclination of the mirror 25.

The mirror 25 is pressed against the protrusions 112 and the pin 114 to be supported. This supporting structure eliminates bearings and can accordingly simplify the construction of the inclination adjusting device and reduce the size thereof. Furthermore, since the leaf spring 116 usually presses the mirror 25 against the protrusions 112 and the pin 114, changes in the inclination of the mirror 25 due to an external force can be prevented.

Figure 26:
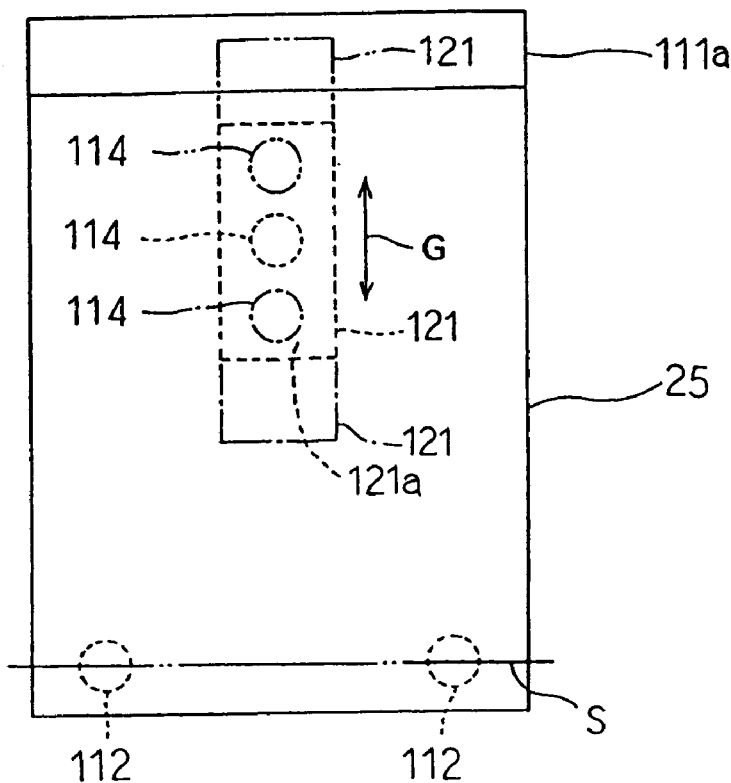
FIG. 26 is a view similar to FIG. 24, showing the mirror inclination adjusting device of a ninth embodiment in accordance with the invention.
Figure 27:
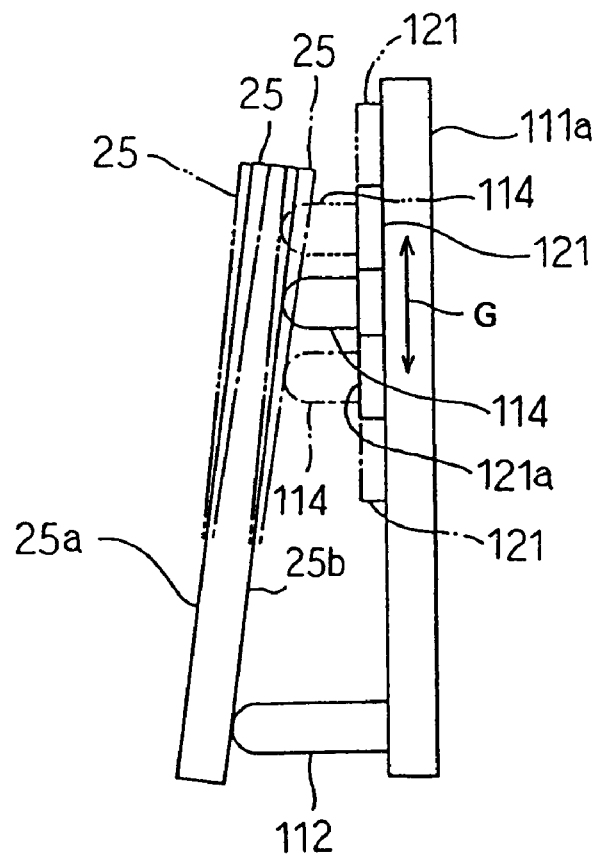
FIG. 27 is a view similar to FIG. 25.

FIGS. 26 and 27 illustrate a ninth embodiment of the invention. The differences between the eighth and ninth embodiments will be described. Identical or similar parts in the ninth embodiment are labeled by the same reference symbols as in the eighth embodiment. In the ninth embodiment, a linear actuator or a linear piezoelectric actuator 121 is fixed to the rear wall 111a, instead of the rotary motor 113. The piezoelectric actuator 121 includes a front section constituting a movable section. The abutting pin 114 is fixed to the front 121a of the actuator 121. Accordingly, the pin 114 is displaced upward and downward (linear movement) in the direction of arrow G in FIGS. 26 and 27 upon drive of the actuator 121.

In the ninth embodiment, too, the pin 114 can be displaced to depart from and come close to the rocking motion center S upon drive of the piezoelectric actuator 121. The construction of the inclination adjusting device other than described above is the same as that in the eighth embodiment. Consequently, the same effects can be achieved in the ninth embodiment as in the eighth embodiment.

Figure 28:
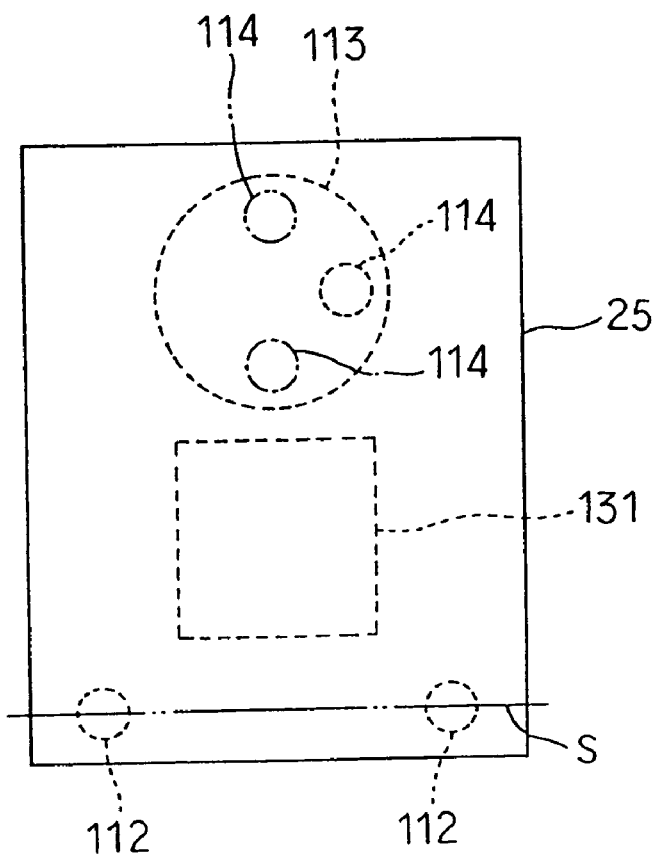
FIG. 28 is a view similar to FIG. 24, showing the mirror inclination adjusting device of a tenth embodiment in accordance with the invention.
Figure 29:
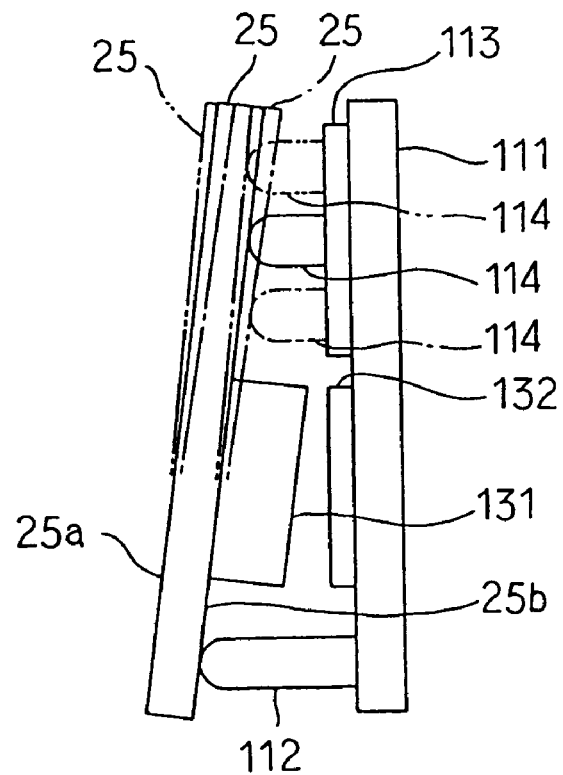
FIG. 29 is a view similar to FIG. 25.

FIGS. 28 and 29 illustrate a tenth embodiment of the invention. The differences between the eighth and tenth embodiments will be described. Identical or similar parts in the tenth embodiment are labeled by the same reference symbols as in the eighth embodiment. In the tenth embodiment, the support 111 is formed into a flat shape. A permanent magnet 131 is bonded to the backside 25b of the mirror 25 and a ferromagnet 132 such as an iron member is bonded to the support 111 so as to be opposed to the permanent magnet 131, instead of the leaf spring 116. Sides of the permanent magnet 131 and the ferromagnet 132 opposed to each other have approximately the same size, so that the mirror 25 can be held at such a position that the permanent magnet 131 and the ferromagnet 132 are opposed to each other. A magnetic attractive force between the permanent magnet 131 and the ferromagnet 132 presses the mirror 25 against the protrusions 112 and the abutting pin 114. Accordingly, the permanent magnet 131 and the ferromagnet 132 constitute light controlling element pressing means in the invention.

According to the tenth embodiment, the entire mirror finished surface 25a can be used as a reflecting surface although the upper half of the mirror finished surface 25a is covered with the leaf spring 116 in the eighth embodiment. Furthermore, the permanent magnet 131 and the ferromagnet 132 both constituting the light controlling element presser are disposed between the mirror 25 and the support 111. Consequently, a further reduction in the size of the inclination adjusting device can be achieved. The construction of the inclination adjusting device other than described above is the same as that in the eighth embodiment. Consequently, the same effects can be achieved in the tenth embodiment as in the eighth embodiment.

Figure 30:
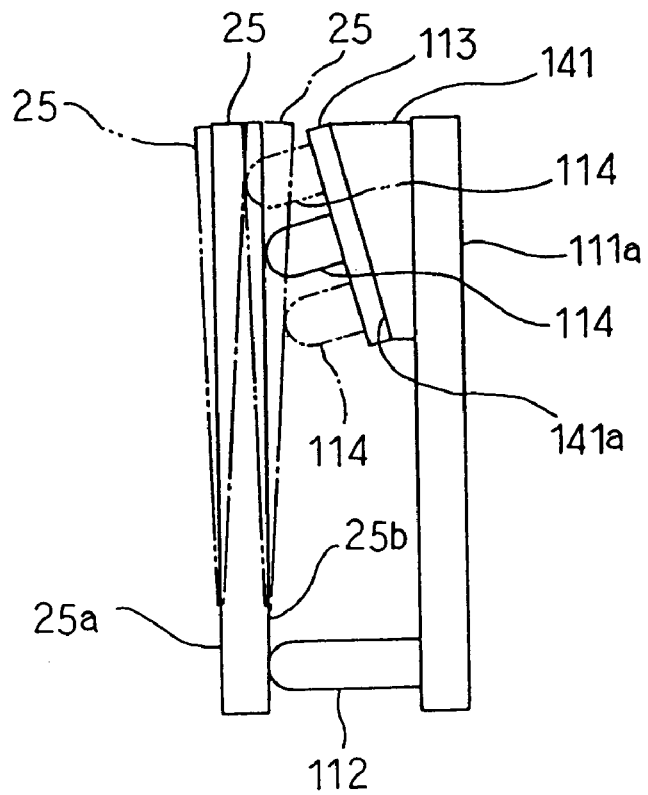
FIG. 30 is a view similar to FIG. 25, showing the mirror inclination adjusting device of an eleventh embodiment in accordance with the invention.

FIG. 30 illustrates an eleventh embodiment of the invention. The differences between the eighth and eleventh embodiments will be described. Identical or similar parts in the eleventh embodiment are labeled by the same reference symbols as in the eighth embodiment. In the eleventh embodiment, an inclined pedestal 141 is fixed on the rear wall 111a of the support 111. The motor 113 is mounted on an inclined face 141a of the pedestal 141.

In the eleventh embodiment, upon drive of the motor 113, the abutting pin 114 is displaced to depart from and come close to the center S, and the distal end of the pin is displaced to depart from and come close to the rear wall 111a. Consequently, an amount of change in the inclination of the mirror 25 can be increased relative to an amount of drive or rotation of the motor 113. An inclination of the inclined face 141a relative to the rear wall 111a can be varied according to an amount of change in the inclination of the mirror 25 relative to an amount of drive or rotation of the motor 113.

The mirror finished surface 25a of the mirror 25 sometimes needs to be adjusted so as to be parallel to the rear wall 111a of the support 111. In this case, the backside 25b of the mirror 25 or the mirror finished surface 25a cannot be rendered parallel to the rear wall 111a when the pin 114 is displaced on a plane parallel to the rear wall 111a as in the eighth to tenth embodiments. In the eleventh embodiment, however, the mirror finished surface 25a of the mirror 25 can be rendered parallel to the rear wall 111a. FIG. 30 shows in the solid line the mirror finished surface 25a parallel to the rear wall 111a.

Figure 31:
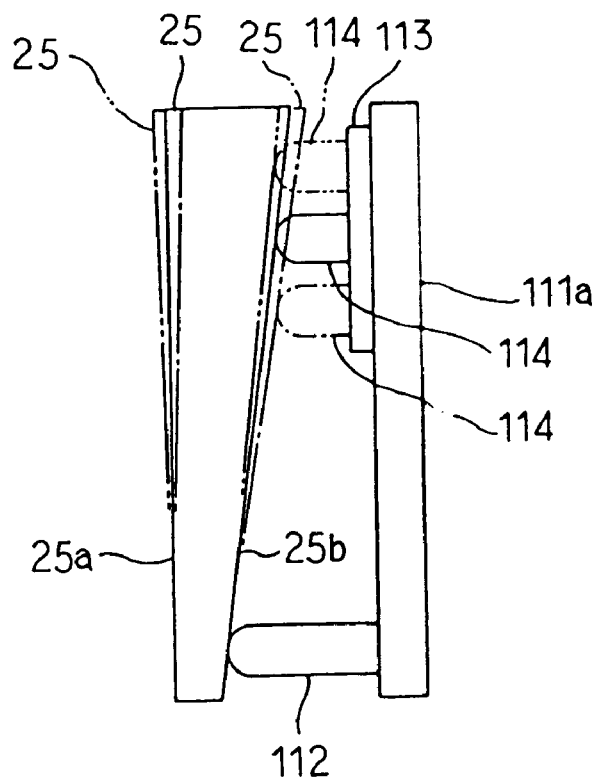
FIG. 31 is a view similar to FIG. 25, showing the mirror inclination adjusting device of a twelfth embodiment in accordance with the invention.

On the other hand, as shown as a twelfth embodiment in FIG. 31, the backside of the mirror 25 may be inclined relative to the mirror finished surface 25a or a plane extending from the mirror finished surface 25a may cross a plane extending from the backside 25b. In this construction, the mirror finished surface 25a can be rendered parallel to the rear wall 111a even when the abutting pin 114 is displaced on the plane parallel to the rear wall 111a as in the eighth to tenth embodiments.

The stator presser, the rotor presser and the rotational shaft presser comprise the leaf springs in the first to seventh embodiments respectively. However, these items may comprise coil springs respectively, instead. A screw may be screwed into the end of the shaft 23 opposed to the rotor 24 so that the shaft may be pressed against the rotor 24 side by a screwing force of the screw. The shaft 23 and the rotor 24 may be constructed integrally with each other. Although the oscillator 36a is fixed to the mounting piece 38 in the first to seventh embodiments, the piezoelectric element 36b may be fixed to the mounting piece, instead.

Each of the eighth to twelfth embodiments may be applied to the half mirror 71 or the prism 90 as well as the mirror 25. Although the resilient member serving as the light controlling element presser comprises the leaf spring 116 in the eighth to twelfth embodiments, it may comprise a coil spring or a rubber member, instead. Furthermore, three or more protrusions 112 may be used, instead of two. A bar-like member may be provided between the side walls 111b so that the mirror 25 is placed thereon. The supporter may comprise a row of protrusions.

The piezoelectric actuator 121 may displace the abutting pin 14 in the tenth to twelfth embodiments, instead of the motor 113. The light controlling element presser may comprise the permanent magnet 31 and the ferromagnet 32. Furthermore, although the motor 113 comprises the piezoelectric motor, it may comprise another type of motor, instead. A linear motor may be used instead of the piezoelectric actuator 112.

Figure 32:
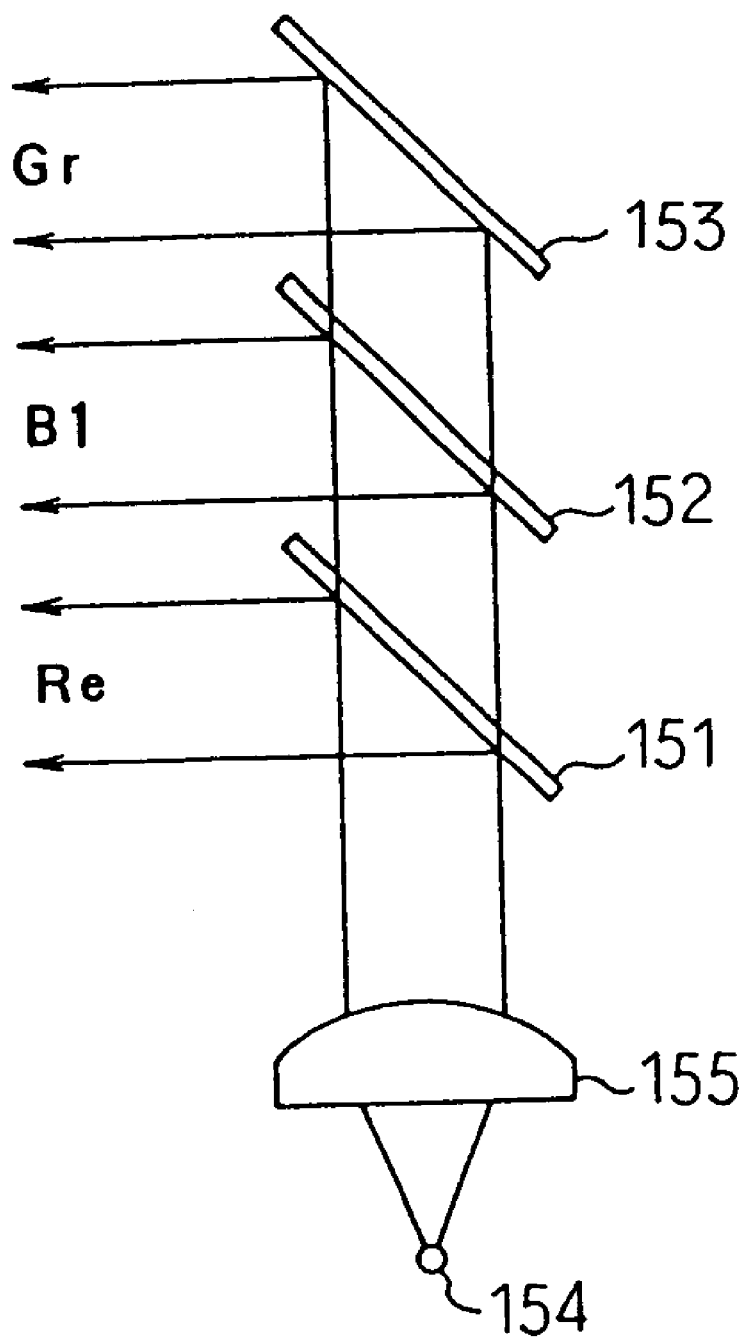
FIG. 32 shows a modified form wherein white light is reflected on a dichroic mirror into three primary colors.
Figure 33:
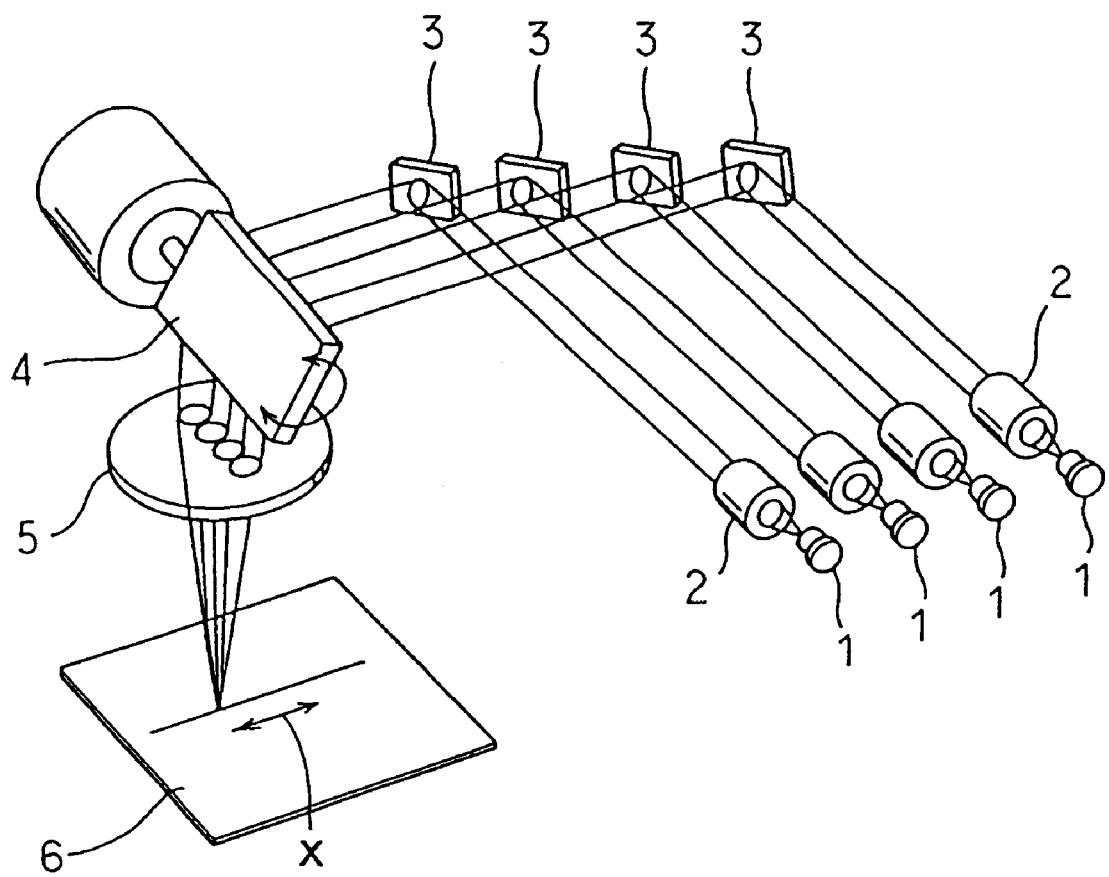
FIG. 33 is a perspective view of a conventional optical scanner.
Figure 34:
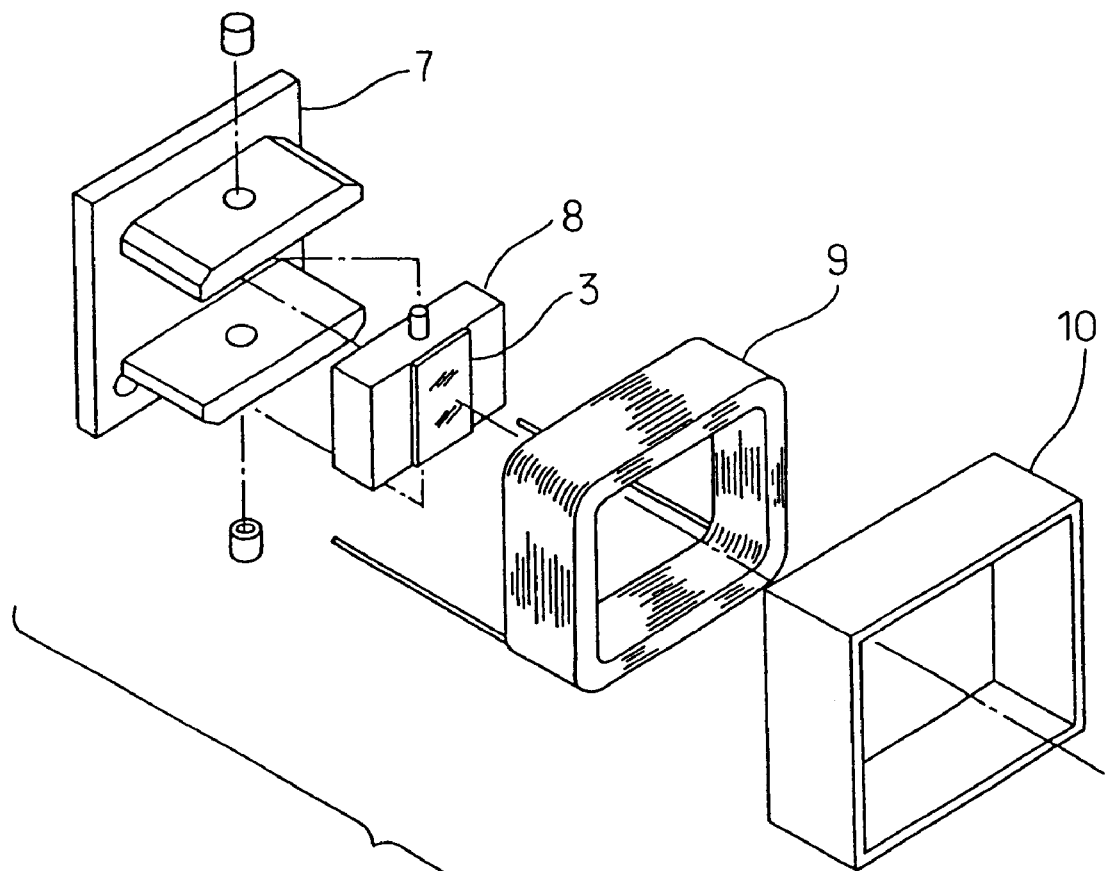
FIG. 34 is an exploded perspective view of another conventional mirror inclination adjusting device.

Although the light controlling element comprises the mirror 25, the half mirror 71 or the prism 90 in the foregoing embodiments, it may comprise a dichroic mirror. The dichroic mirror reflects light of one color and transmits that of other colors. By utilizing this property, the dichroic mirror is constructed as shown in FIG. 32. Three dichroic mirrors 151 to 153 are arranged in parallel to one another. A light source 154 emits a white light which is changed into parallel beams of light through a lens 155. The beams of light are irradiated onto the dichroic mirrors 151 to 153 such that three primary colors of light, red Re, blue Bl and green Gr, are obtained. In this case, the inclinations of the dichroic mirrors 151 to 153 are adjusted by the inclination adjusting device of each of the foregoing embodiments so that the lights of red Re, blue Bl and green Gr are rendered parallel to one another. Additionally, although the inclination of the light controlling element is adjusted by the inclination adjusting device in each of the foregoing embodiments, the inclination of each of various types of members may be adjusted, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An optical scanner comprising:
a light emitting element which emits a light beam;
an inclination adjusting element including:
   a light controlling element which adjusts an optical path of the light beam emitted by the light emitting element;
   a mount;
   a holding member provided on the mount for rockably holding the light controlling element;
   an abutting member abutting a portion of the light controlling element spaced away from a center of rocking motion;
   a pressing element which presses the light controlling element against the abutting member; and
   an actuator provided on the mount for displacing the abutting member in abutment with the light controlling element so that a distance between the portion of the light controlling element abutted against the abutting member and the center of rocking motion is varied, whereupon the inclination of the light controlling element is adjusted; and
a scanning element which scans a photosensitive member by irradiating onto the photosensitive member a light beam whose optical path has been adjusted by the light controlling element.

2. An optical scanner according to claim 1, wherein a plurality of the light emitting elements and a plurality of the inclination adjusting elements are provided, and which further comprises a convergent lens provided between the scanning element and the photosensitive member to converge the light beams delivered from the respective scanning element.

3. An optical scanner according to claim 1, wherein the pressing element comprises a resilient member.

4. An optical scanner according to claim 1, wherein the pressing element presses the light controlling element against the abutting member by a magnetic attractive force.

5. An optical scanner according to claim 1, wherein the actuator comprises an ultrasonic motor including a stator provided with a piezoelectric element and a rotor rotated by a traveling wave generated in the stator, and the abutting member is disposed on the rotor.

6. An optical scanner according to claim 1, wherein the actuator comprises a linear piezoelectric actuator.

7. An optical scanner according to claim 1, wherein the light controlling element comprises a mirror.

8. An optical scanner according to claim 1, wherein the light controlling element comprises a half mirror.

9. An optical scanner according to claim 1, wherein the light controlling element comprises a prism.

10. An optical scanner according to claim 1, wherein the light controlling element comprises a dichroic mirror.

11. An inclination adjusting device for a light controlling element, comprising:
a light controlling element;
a mount;
a holding member provided on the mount for rockably holding the light controlling element;
an abutting member abutting a portion of the light controlling element spaced away from a center of rocking motion;
a pressing element which presses the light controlling element against the abutting member; and
an actuator provided on the mount for displacing the abutting member in abutment with the light controlling element so that a distance between the portion of the light controlling element abutted against the abutting member and the center of rocking motion is varied, whereupon the inclination of the light controlling element is adjusted.

12. An inclination adjusting device according to claim 11, wherein the pressing element comprises a resilient member.

13. An inclination adjusting device according to claim 11, wherein the pressing element presses the light controlling element against the abutting member by a magnetic attractive force.

14. An inclination adjusting device according to claim 11, wherein the light controlling element comprises a mirror.

15. An inclination adjusting device according to claim 11, wherein the light controlling element comprises a half mirror.

16. An inclination adjusting device according to claim 11, wherein the light controlling element comprises a prism.

17. An inclination adjusting device according to claim 11, wherein the light controlling element comprises a dichroic mirror.

18. An inclination adjusting device according to claim 11, wherein the actuator comprises an ultrasonic motor including a stator provided with a piezoelectric element and a rotor rotated by a traveling wave generated in the stator, and the abutting member is disposed on the rotor.

19. An inclination adjusting device according to claim 11, wherein the actuator comprises a linear piezoelectric actuator.

* * * * *